United States Patent

Haruguchi et al.

[11] Patent Number: 5,923,636
[45] Date of Patent: Jul. 13, 1999

[54] OPTICAL PICKUP

[75] Inventors: Takashi Haruguchi; Kouki Kojima; Kazuyuki Nakashima, all of Fukuoka; Fuminobu Furukawa, Onojo, all of Japan

[73] Assignee: Matsushita Electric Industrial Co., Ltd., Osaka, Japan

[21] Appl. No.: 08/878,183

[22] Filed: Jun. 18, 1997

[30] Foreign Application Priority Data

Nov. 21, 1996 [JP] Japan ..................................... 8-310348

[51] Int. Cl.[6] ....................................................... G11B 7/12
[52] U.S. Cl. ..................... 369/112; 369/44.14; 369/44.37
[58] Field of Search ..................................... 369/112, 109, 369/110, 103, 44.11, 44.12, 44.14, 44.32, 44.38

[56] References Cited

U.S. PATENT DOCUMENTS

| | | |
|---|---|---|
| 5,136,152 | 8/1992 | Lee . |
| 5,281,797 | 1/1994 | Tatsuno . |
| 5,513,164 | 4/1996 | Tanaka et al. . |
| 5,636,190 | 6/1997 | Choi . |
| 5,696,749 | 12/1997 | Brazas, Jr. et al. . |
| 5,703,856 | 12/1997 | Hayashi et al. . |

FOREIGN PATENT DOCUMENTS

| | | |
|---|---|---|
| 0747893 A2 | 12/1996 | European Pat. Off. . |
| 4330794 A1 | 3/1994 | Germany . |
| 0855363 | 2/1996 | Japan . |

OTHER PUBLICATIONS

Patent Abstracts of Japan, vol. 097, No. 011, Nov. 28, 1997, & JP 09 198703 A (Alpine Electron, Inc.), Jul. 31, 1997.

Patent Abstracts of Japan, vol. 096, No. 011, Nov. 29, 1996, & JP 08 180455 A (Sony Corp.), Jul. 12, 1996.

Patent Abstracts of Japan, vol. 097, No. 002, Feb. 28, 1997, & JP 08 255372 A (Victor Co. of Japan, Ltd.), Oct. 1, 1996.

*Primary Examiner*—Muhammed N. Edun
*Attorney, Agent, or Firm*—Stevens, Davis, Miller & Mosher, L.L.P.

[57] ABSTRACT

An optical pickup for recording on and reproduction from recording media of different recording densities (e.g. a high density disk such as a DVD and a lower density disk such as an ordinary CD), and having a compact, thin and low power-consumption design. The optical pickup includes an objective lens, a first optical unit having a light-emitting element and a light-receiving element which are used for recording on and reproduction from the high-density optical disk, a second optical unit having a light-emitting element and a light-receiving element which are used for recording on and reproduction from the low-density optical disk, a beam splitter for guiding optical axes of the first and second optical units to the same optical axis, and a wavelength filter for changing a diameter of light beams incident on the objective lens between at the time of recording and reproduction for the high-density optical disk and at the time of recording and reproduction for the low-density optical disk.

44 Claims, 13 Drawing Sheets

OPTICAL PICKUP

BACKGROUND OF THE INVENTION

1. Field of the Invention

This invention relates to an optical pickup for recording on and reproducing from recording media of different recording densities, such as a high-density optical disk, a compact disk and the like.

2. Description of the Related Art

A conventional optical pickup for recording and reproducing on/from a high-density recording optical disk and a compact disk will be described. For convenience, an explanation will be given with a DVD (digital video disk) as a high-density optical disk, and a CD (compact disk) as a low-density optical disk.

FIG. 13 shows a plan view of a conventional optical pickup, and a cross-sectional view of an essential part thereof. In FIG. 13, the reference numeral 50 denotes an optical pickup for a high-density optical disk, and a high-density optical disk objective lens 54 for condensing a laser beam 53 onto the high-density optical disk 52 is adhesively bonded and fixed to an objective lens holding tube 51. A coil unit 55, comprising a focusing coil and a tracking coil adapted for actuation in a focusing direction and a tracking direction, is adhesively bonded and fixed to the objective lens holding tube 51. The coil unit 55 is fitted in a permanent magnet to form a magnetic circuit for driving the objective lens holding tube 51 in the focusing direction and the tracking direction. The objective lens holding tube 51 is held in a neutral position by a non-magnetic, electrically conductive, linear elastic member 57 and electric power is supplied to the coil unit 55.

An optical system of the optical pickup 50 of the above construction for reproduction from the high-density optical disk will now be described. An optical unit 61 for a high-density optical disk contains a light-emitting element and a light-receiving element for a laser beam 53 having a wavelength of 635 to 650 nm. The laser beam 53 passes through a collimator lens 62 to be converted to parallel rays of light, which then are totally reflected by a surface of a rise mirror 63 with a multi-layer coating to be condensed by the high-density optical disk objective lens 54, and form an optical spot on the high-density optical disk 52.

Then, the laser beam 53 reflected by the high-density optical disk 52 goes back along the above path, and is again incident on the high-density optical disk optical unit 61 to pass through a diffraction grating (not shown) to be received by the light-receiving element (not shown). In accordance with optical information, which is subjected to photoelectric conversion by the light-receiving element, focus detection is effected by a conventional optical Foucault method, and track detection is effected by a conventional phase difference method. Thus, the high-density optical disk objective lens 54 is always focused on the high-density optical disk 52, and is controlled to follow the information track. The high-density optical disk (DVD) 52 is driven by a spindle motor 71 for rotation.

Next, the low-density optical disk (CD) will be described. The reference numeral 70 denotes the optical pickup for a low-density optical disk, and the construction and operation of the optical pickup 70 are similar to those of the optical pickup 50 for a high-density optical disk, and therefore explanation thereof will be omitted. In its optical system, an optical unit 64 for a low-density optical disk contains a light-emitting element and a light-receiving element for a laser beam 65 having a wavelength of 780 nm. Laser beam 65 is totally reflected by a surface of a rise mirror 66 with a multi-layer coating to be condensed by a low-density optical disk objective lens 67 to form an optical spot on the low-density optical disk 68.

Then, the laser beam 65 reflected by the low-density optical disk 68 goes back along the above path to be again incident on the low-density optical disk optical unit 64 to pass through a diffraction grating (not shown) to be received by the light-receiving element (not shown). In accordance with optical information, which is subjected to photoelectric conversion by the light-receiving element, focus detection is effected by a conventional optical Foucault method, and track detection is effected by a conventional three-beam method. Thus, the low-density optical disk objective lens 67 is always focused on the low-density optical disk 68, and is controlled to follow the information track.

Thus, the high-density optical disk optical pickup 50 and the low-density optical disk optical pickup 70 are constructed independently of each other whereby recording and reproduction can be effected for the compact disk.

However, the above conventional optical pickup construction includes the two independent optical systems having the high-density optical disk optical pickup and the optical pickup for reproduction from the compact disk, and therefore involves problems that the number of the component parts is large, it is difficult to achieve a compact design of the optical pickup unit, and that it is difficult to reduce consumption of electric power and cost.

SUMMARY OF THE INVENTION

It is therefore an object of this invention to provide an optical pickup which is capable of performing recording on and reproduction from recording media of different recording densities, and has a compact, thin and low power-consumption design.

The present invention has been made in order to overcome the above problems, and provides an optical pickup enabling recording on and reproduction from a high-density optical disk and a low-density optical disk, and comprising an objective lens; an actuator mounting the objective lens thereon; a first optical unit including a light-emitting element and a light-receiving element for use in reproduction from the high-density optical disk; a second optical unit including a light-emitting element and a light-receiving element for use in reproduction from the low-density optical disk; light splitting means for guiding optical axes of the first and second optical units to the same optical axis; a collimator lens for converting light outgoing from the first optical unit into parallel rays of light; and diaphragm means for changing a diameter of the beam incident on the objective lens at the time of reproduction from the high-density optical disk and at the time of reproduction from the low-density optical disk.

With this construction of the invention, the optical axes of the first and second optical units can be guided to the same optical axis, and a single objective lens can be used in common to recording and reproduction for the high-density optical disk and recording and reproduction for the low-density optical disk with a minimum spherical aberration.

DESCRIPTION OF THE PREFERRED EMBODIMENTS

Figure 1:
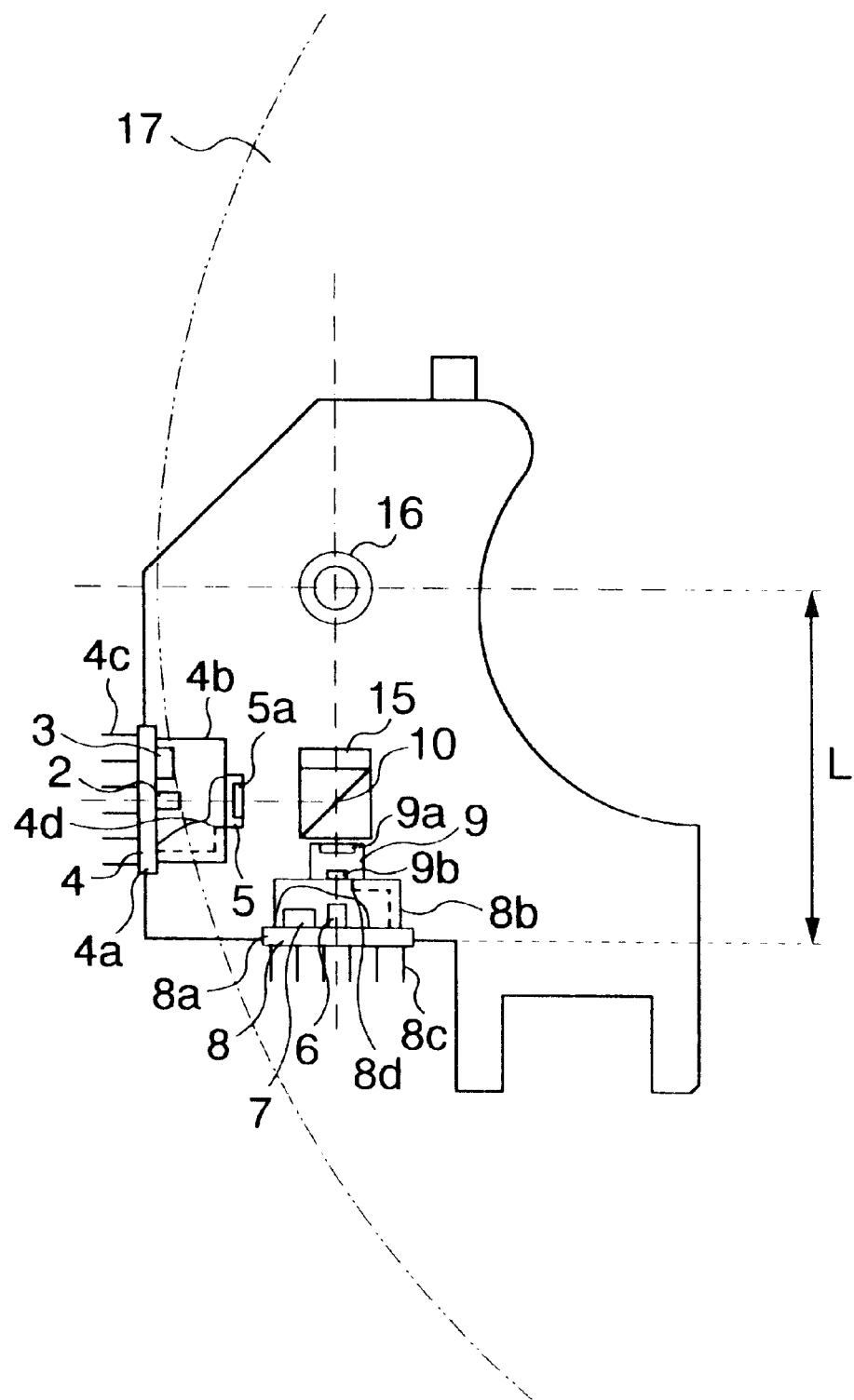
FIG. 1 is a view showing a construction of an optical pickup according to a first embodiment of the invention.

A first embodiment of the present invention will now be described with reference to the drawings. FIG. 1 is a view showing the construction of an optical pickup according to a first embodiment of the invention. In FIG. 1, an optical unit 4 comprises a base plate portion 4a, on which a light source 2 for emitting light for a high-density optical disk, a light-receiving element 3 for receiving the light reflected by the high-density optical disk, and so on are mounted, a side wall portion 4b provided to enclose these parts, and a light outgoing portion 4d defined by an opening formed through the side wall portion 4b. The base plate portion 4a and the side wall portion 4b may be integral with each other or may be separate from each other. In the case where these portions are formed integral with each other, an assembling process can be simplified, and productivity can be enhanced. Preferably, the optical unit 4 is formed of metal, ceramics or the like since such material can satisfactorily radiate heat generated by the light source.

Among metallic materials, it is preferable to use a metallic material with a high thermal conductivity, such as Cu, Al and Fe, and an alloy material with a high thermal conductivity such as Fe—Ni alloy, Fe—Ni—Co alloy. The reason for this is that these materials are inexpensive and have a high heat-radiating property, and also serve as an electromagnetic shield for shutting off noises such as electromagnetic waves from a high-frequency superimposed circuit and the like. Among these materials, Fe, Fe—Ni alloy and Fe—Ni—Co alloy have a low thermal resistance, and have a good heat-radiating property, and therefore can efficiently radiate the heat, produced by the light source 2, to outside. Besides, these materials are inexpensive, and therefore the optical pickup device can be provided at a low cost.

A carriage (not shown), having a large thermal capacity, is made to contact with the base plate portion 4a and, if necessary, the side wall portion 4b, whereby heat generated by the light source can escape to the outside. Therefore, the larger an area of that portion of the base plate portion 4a in contact with the carriage is, the better the heat-radiating property is.

Terminals 4c for supplying electric power to the light source and for transmitting electrical signals from the light-receiving element 3 to a calculation circuit (not shown) are provided on the base plate portion 4a. These terminals 4c may be of the pin type, or of the printed type. Here, explanation is given particularly to the case where the terminals 4c are of the pin type. The terminals 4c are inserted respectively into a plurality of holes (not shown) formed through the base plate portion 4a in such a manner that the terminals 4c are held out of electrical contact with the base plate portion 4a. Preferably, the terminals 4c are made of Fe—Ni—Co alloy, Fe—Ni alloy, Fe—Cr alloy or the like. One preferred means for interrupting electrical contact between the terminals 4c and the base plate portion 4a is an insulating film or the like provided at that portion or area of contact between each terminal 4c and the base plate portion 4a in each hole, and preferably this contact portion is sealed so that the outside air will not enter thereinto. It is preferred to use a hermetic seal or the like which meets these requirements, and can achieve both insulation and sealing at the same time. Here, it is particularly preferred to use a hermetic seal of the matching sealing type or of the compression sealing type. The reason for this is that since these seals can easily achieve both insulation and sealing and moreover are very inexpensive, the process of mounting the terminals 4c on the base plate portion 4a can be simplified, and also the production cost of the optical pickup can be reduced. Furthermore, since the high air-tightness and excellent insulation can be kept over a wide temperature range, the optical pickup can be enhanced in reliability and since the terminals can be formed relatively freely into a desired shape, the degree of freedom in design can be increased.

Preferably, the light source is one which emits monochromatic light, and has good coherence, directivity and condensing properties since a beam spot of a suitable shape can be formed relatively easily, and also generation of noises can be suppressed. It is preferred to use one of various lasers such as a solid state laser, a gas laser and a semiconductor laser which meet these requirements. Particularly, the semiconductor laser is most suitable as the light source 2 since it is very small in size and can easily realize miniaturization of the optical pickup.

Preferably, an oscillation wavelength of the light emitted from the light source is not more than 800 nm since a beam spot formed upon converging of the light outgoing from the light source on the recording medium can be made as small as a size generally corresponding to the pitch of the track formed on the recording medium. If the oscillation wavelength of the light emitted from the light source is not more than 650 nm, such a small beam spot can be formed which enables reproduction of information from the recording medium having the information recorded thereon at a very high density, and therefore storage means with a large capacity can be easily realized, so that such a light source is particularly suitable for recording on and reproduction from the high-density optical disk. Here, assuming that the light source is used for reproduction from a DVD, a light source is used which provides a wavelength of about 600 nm to about 680 nm and preferably of 630 to 660 nm.

Examples of materials, which can realize an oscillation wavelength of not more than about 800 nm when a light source is constituted by a semiconductor laser, include AlGaInP, AlGaAs, ZnSe and GaN, and among these materials, AlGaAs is particularly preferred since among compound materials, it easily achieves a crystal growth, and therefore makes the production of the semiconductor laser easy, so that a yield rate is made high and the high productivity can be realized. Examples of materials, which can realize an oscillation wavelength of not more than 650 nm, include AlGaInP, ZnSe and GaN. When the semiconductor laser employing such materials is used as the light source, a diameter of a beam spot to be formed on the recording medium can be made smaller, so that the recording density can be further enhanced, and reproduction from the high-density optical disk is mad possible.

Among these materials, AlGaAsP is particularly preferred since it exhibits a stable performance over a long term to improve the reliability of the light source.

Preferably, the light source, when used exclusively for reproduction purposes, provides an output of about 3 (mW) to about 10 (mW) since it is possible to suppress the consumption of the energy to a minimum while securing a sufficient amount of light for the reproduction, and also to suppress an amount of heat radiated from the light source. In the case where the light source is used for recording and reproduction purposes, a large amount of energy is required for changing the condition of the recording layer during the recording, and therefore an output of at least not less than 20 (mW) is necessary. However, when an output exceeds 60 (mW), it is made difficult to permit the heat radiated from the light source to escape to the outside, so that the light source and its neighboring parts becomes high in temperature, and the reliability of the optical pickup (that is, the light source) is detracted. This is not desirable.

As described later in detail with reference to FIG. 2, an optical member 5 is joined to the light outgoing portion 4d of the optical unit 4. The optical member 5 functions to guide that light, which outgoes from the light source 2 and then is reflected by the recording medium, to a predetermined portion of the light-receiving element 3. Here, a diffraction grating formed on the optical member 5 is used to guide the return light.

The optical member 5 is formed by a transparent plate member, and the diffraction grating 5a for dividing an optical path is formed on at least one of opposite surfaces thereof substantially perpendicularly intersecting the optical axis of the emitted light. Here, the optical member 5 is preferably formed into a plane parallel plate as a whole so that generation of aberration can be prevented, and therefore a good reproduction signal or good focusing/tracking signals can be formed. Further, the optical member 5 is so mounted that its upper and lower surfaces are disposed substantially perpendicular to the optical axis of the light passing through these upper and lower surfaces, and generation of astigmatism can be prevented, and the degradation of the reproduction signals due to the obscure spot can be prevented.

Preferably, the optical member 5 is made of a material with high light-transmitting properties, such as glass and a resin since such a material prevents reduction in amount of light, and also will not degrade optical characteristics of the light having transmitted through the optical member 5. Particularly, since glass will not cause birefringence (double refraction), and can retain the characteristics of the transmitted light satisfactorily, it is particularly preferred as the material for the optical member 5. Among glass materials, it is preferred to use optical glass, such as BK-7, which involves a small wavelength scattering, that is, has a large Abbe number, particularly since it can prevent the generation of a spherical aberration due to a wavelength variation. Among the optical glass materials, BK-7 is most suitable for the optical member 5 since it is inexpensive.

In this embodiment, the optical member 5 is joined directly to the light outgoing portion 4d provided at the side wall portion 4b of the optical unit 4 but the optical unit 4 and the optical member 5 may be provided in spaced relation to each other. With such arrangement, a distance between the light source 2 and the optical member 5, which is problematic when the optical unit 4 varies in height, can be accurately adjusted, so that the optical characteristics of the light transmitted to the light-receiving element 3 by the optical member 5 can be favorably maintained to enable the accurate signal detection.

Preferably, a space defined by the optical unit 4 and the optical member 5, that is, a space in which the light source 2, the light-receiving element 3 and so on are mounted, is sealed. With such arrangement, impurities or foreign matter, such as dirt and moisture, are prevented from entering into the interior of the package, so that the performances of the light source 2 and light-receiving element 3 can be maintained, and also the optical characteristics of the outgoing light can be prevented from being degraded. Preferably, inert gas such as N2 gas, dry air and Ar gas is charged in the space closed by the optical unit 4 and the optical member 5 so that the degradation of the optical characteristics due to dew condensation on the surface of the optical member 5 opened to the interior of the optical unit 4 as well as the degradation of the characteristics due to the oxidation of the light source 2 and the light-receiving element 3 can be prevented.

In the optical unit 4 of this embodiment, the light outgoing portion 4d is covered with the optical member 5 while the optical member 5 may be housed within the optical unit 4 and the light outgoing portion 4d may be covered with a cover member. With such construction, dew condensation on the surface of the optical member can be prevented, and also the optical member itself may be prevented from absorbing moisture to be changed in nature or properties.

In FIG. 1, an optical unit 8 comprises a base plate portion 8a, on which a light source 6 for emitting light for a low-density optical disk, a light-receiving element 7 for receiving the light reflected by the low-density optical disk, and so on are mounted, and a side wall portion 8b provided to enclose these parts. Particularly, those portions of the optical unit 8, which are different from those of the optical unit 4, will be described below.

Preferably, the light source 6 has an oscillation wavelength of not more than 800 nm since such oscillation wavelength enables a beam spot, formed by light outgoing from the light source and converging on the recording medium, to be easily made to have a size generally corresponding to the pitch of the track formed on the recording medium. Particularly, the light source 6 can employ an oscillation wavelength longer than that of the light source 2, and for example, in reproduction from a CD, a sufficiently large beam spot can be formed on the low-density optical disk with the oscillation wavelength of about 780 nm.

While an optical member 9 is generally similar in construction to the optical member 5, a diffraction grating 9a formed on the optical member 9 is different from that of the optical member 5. So, the diffraction grating 9a will be described below.

In many cases, a signal detection method is different between a high-density optical disk and a low-density optical disk. Therefore, in many cases, a manner, in which a light-receiving portion is arranged in the light-receiving element 7 is different from that in which a light-receiving portion is arranged in the light-receiving element 3. Therefore, in the case where a focus error signal and so on are formed by the diffraction grating 9a when the light from the optical disk is transmitted to the light-receiving element 7, the diffraction grating 9a is preferably different in construction from that of the diffraction grating 5a to form signals optimized for the respective optical disks, thereby enabling realization of an optical pickup which can perform precise signal formation and operation control and which is highly reliable and is hard to malfunction.

Particularly in the case where tracking control is effected by a three-beam method, a diffraction grating serving as a beam forming portion 9b is provided on a light outgoing portion of the optical member 9. The beam forming portion 9b is provided at such a position to permit the emitted light to transmit therethrough and to keep away from an optical path, along which the light reflected by the optical disk and diffracted by the diffraction grating 9a, is directed toward the light-receiving element 7.

A beam splitter 10 functions to direct the light beams emitted respectively from the light sources 2 and 6 toward the optical disk. Generally, a half mirror, a polarized-light splitting film or the like is used for the beam splitter 10 while a more preferred form of beam splitter 10 of the invention has such a nature to reflect the light (incident light perpendicular to the optical axis of an outgoing light) from the light source 2 at a high rate, and transmit therethrough the light (incident light parallel to the optical axis of the outgoing light) from the light source 6 at a high rate. In such case, light loss in the beam splitter 10 can be suppressed to a minimum, and therefore the efficiency of light utilization can be enhanced. The enhanced efficiency of light utilization enables suppressing an amount of the light emitted from the light source 2 or the light source 6 to prolong the lifetime of the light sources 2 and 6, so that an optical disk unit having such optical pickup mounted thereon is enhanced in reliability. So, such enhanced efficiency is desirable.

Preferably, reflection means having a wavelength selection function is used as the beam splitter 10 having the above nature. The reflection means having the wavelength selection function serves to transmit therethrough light having a certain wavelength and also to reflect light having another wavelength. Particularly in this embodiment, the beam splitter 10 is constructed to reflect most of the light from the light source 2 and transmit therethrough most of the light from the light source 6, which enables most efficiently setting the efficiency of light utilization with respect to the light sources 2 and 6. Therefore, a large load hardly acts on either of the light sources 2 and 6, and therefore the light sources 2 and 6 can be averaged in life and the optical pickup can be prolonged in life.

A wavelength filter 15 is formed to transmit therethrough the light emitted from the light source 2 and reflect or absorb the light emitted from the light source 6, and serves as a diaphragm for limiting a diameter of the light flux (beam) emitted from the light sources 2 and 6.

Preferably, the wavelength filter 15 is disposed between the beam splitter 10 and an objective lens 16 or between the optical unit 8 and the beam splitter 10 to be much preferable in terms of productivity and cost reduction since there is no need to provide a plurality of filters corresponding to the respective light sources and also light beams from each light source are incident on the wavelength filter 15 before divergence to enable limiting the wavelength filter 15 to a minimum size. Above all, it is particularly preferred that the wavelength filter 15 be beforehand positioned relative to the beam splitter 10 to be then joined thereto since the number of parts required to be positioned during the assembling of the optical pickup can be reduced to enhance the productivity of the optical pickup, and also deviation of the optical axis of light from the central axis of the wavelength filter 15 can be suppressed to a minimum.

The wavelength filter 15 is not an essential constituent element, but may be omitted, for example, by suitably designing the diffraction grating 9a and the objective lens 16. In this case, the overall construction of the optical pickup is represented by the constituent elements shown in FIG. 2.

Next, the arrangement of the optical units in the first embodiment of the invention will be described. In this embodiment, the optical unit 4 and the optical unit 8 are angularly spaced substantially 90 degrees from each other about the beam splitter 10, and the optical unit 8 is disposed substantially in parallel to the optical axis extending from the wavelength filter 15 to the objective lens 16, and the optical unit 4 is disposed substantially perpendicular to the optical axis extending from the wavelength filter 15 to the objective lens 16.

Here, in the case where there is not used any member such as a diffraction grating for correcting a distance, it is preferred that a distance between opposed end surfaces of the optical unit 4 and the beam splitter 10 be longer than a distance between opposed end surfaces of the optical unit 8 and the beam splitter 10. With such arrangement, a distance, over which light used for reproduction from the high-density optical disk travels from the light source 2 to the objective lens 16, is longer than a distance, over which light used for reproduction from the low-density optical disk travels from the light source 6 to the objective lens 16. Hence, the light incident on the objective lens 16 can be spread over a larger area, and a larger NA required for recording on and reproduction from the high-density optical disk can be easily realized. Also, an amount of aberrations developing respectively in light beams emitted respectively from the light sources 2 and 6 can be reduced.

Further, with such arrangement, a distance L between the lower end surface of the optical unit 8 and a center of the objective lens 16 can be made short as compared with the case where the arrangement of the optical units 4 and 8 is reversed, so that a carriage for the optical pickup can be made small-sized. Therefore, other electronic parts (e.g. a board and the like) can be mounted in an area which has heretofore been occupied by the carriage, so that the optical disk unit having this optical pickup mounted thereon can be made small-sized and thin.

Figure 2:
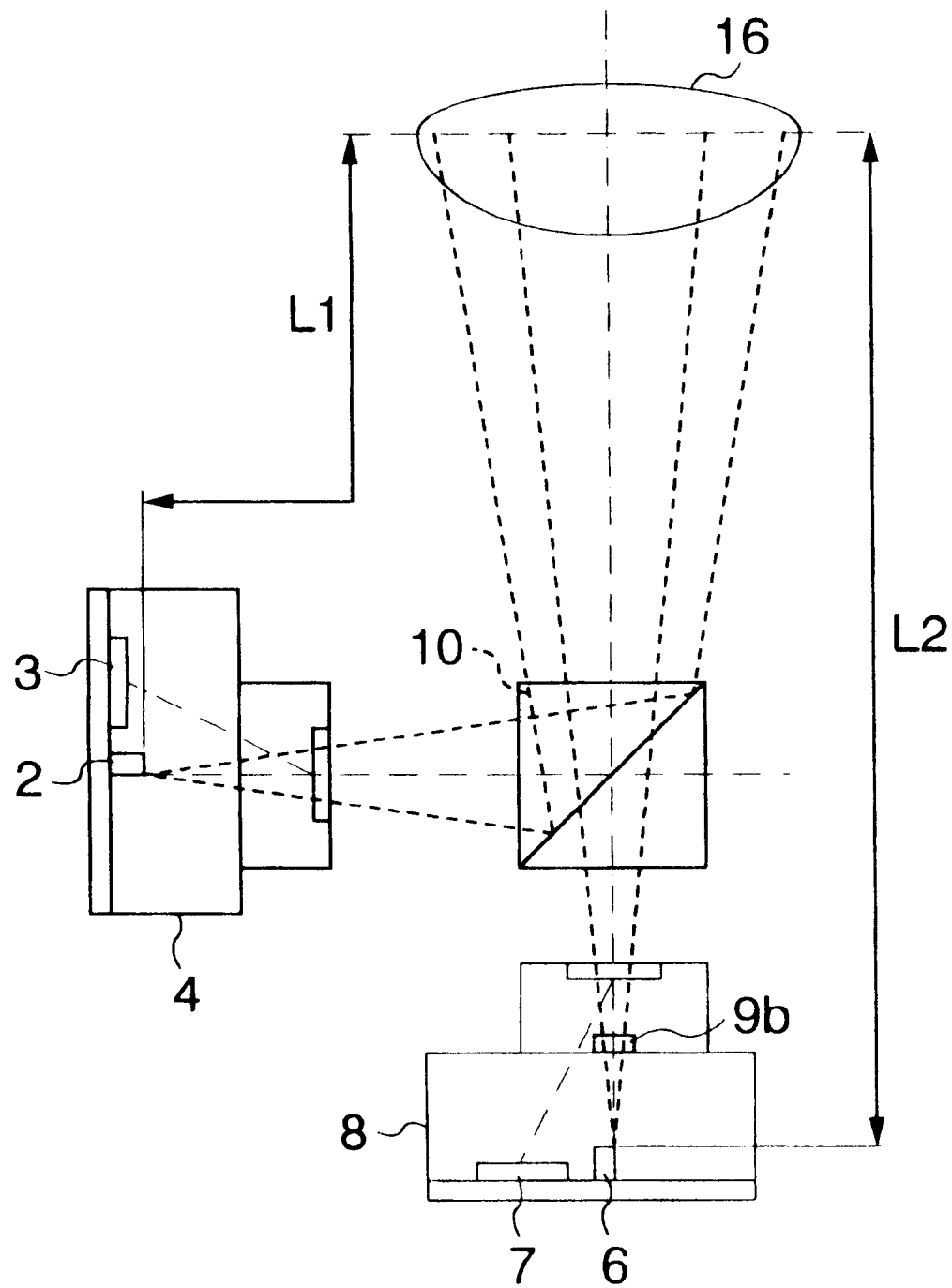
FIG. 2 is a view showing optical path lengths in the optical units shown in FIG. 1.

FIG. 2 is a view showing lengths of the optical path in the arrangement of the optical units shown in FIG. 1. In FIG. 2, for the same reasons described above, a distance L1 between the optical unit 4 and the objective lens 16 is preferably longer than a distance L2 between the optical unit 8 and the objective lens 16 (L1>L2). Particularly, the following relation is preferred:

$$0.55 \leq L2/L1 \leq 0.75$$

With such arrangement, generation of aberrations in light beams emitted from the light sources 2 and 6 can be suppressed while making the optical pickup small-sized and thin. This makes it possible to realize an optical pickup having good recording and reproducing characteristics for a plurality of optical disks of different recording densities.

Next, the configuration of the diffraction gratings 5a and 9a as well as the light-receiving elements 3 and 7 mounted on the optical units 4 and 8, respectively, will be described with reference to FIG. 3.

Figure 3:
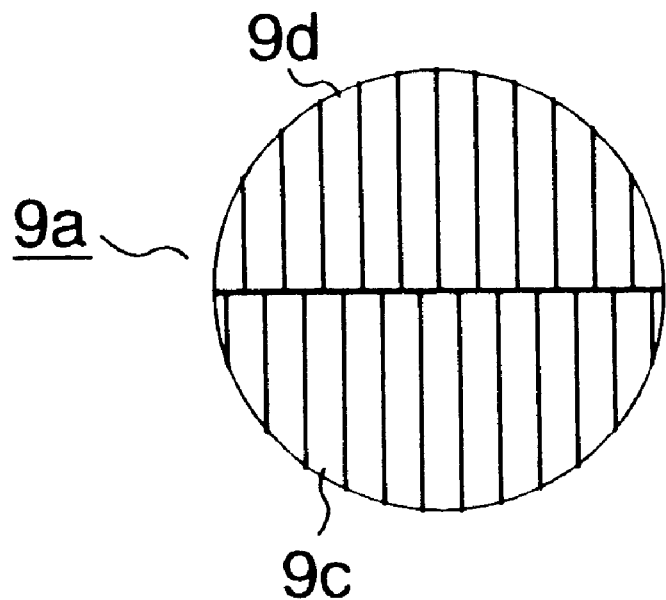
FIG. 3 is a view showing a configuration of diffraction gratings in the first embodiment of the invention.
Figure 3:
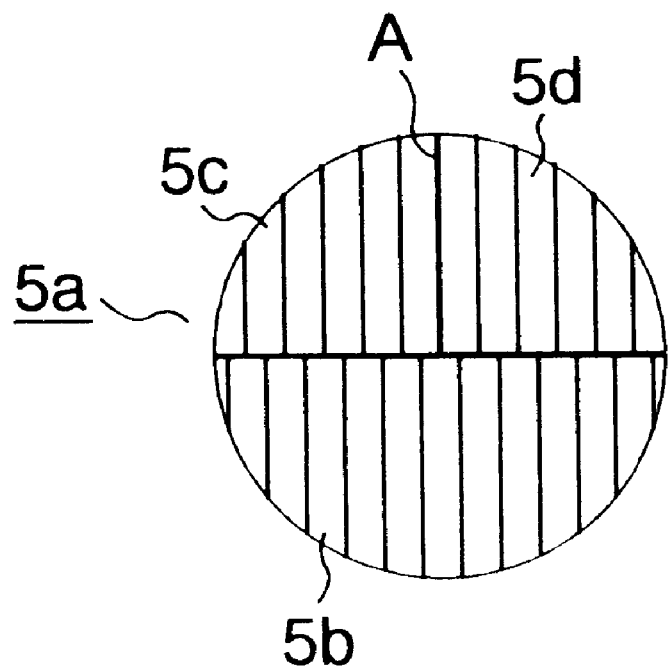
Figure 4:
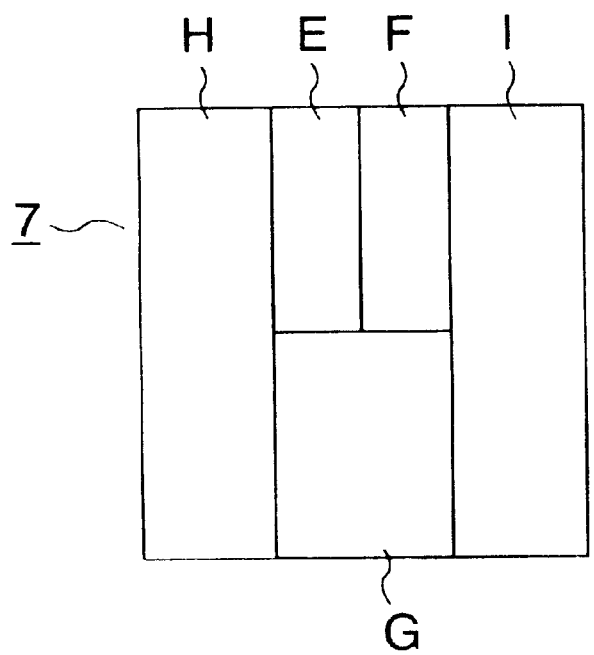
FIG. 4 is a view showing a construction of light-receiving elements in the first embodiment of the invention.
Figure 4:
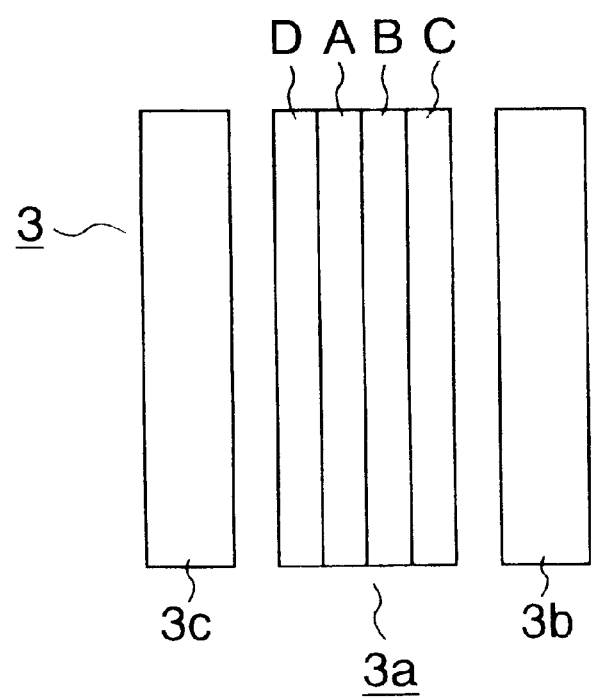

FIG. 3 show a configuration of the diffraction gratings in the first embodiment of the invention, and FIG. 4 shows a construction of the light-receiving elements in the first embodiment of the invention.

In FIG. 3, the diffraction grating 5a corresponds to the optical unit 4, and is divided into three areas 5b, 5c and 5d as shown in this Figure. The diffraction grating 9a corresponds to the optical unit 8, and is divided into two regions 9c and 9d.

In FIG. 4, the light-receiving element 3 is mounted on the base plate portion 4a of the optical unit 4, and four light receiving areas are provided at a central portion of the light-receiving element 3, while two light receiving areas are provided respectively on opposite sides of the four light receiving areas. The light-receiving element 7 is mounted on the base plate portion 8a of the optical unit 8, and comprises five light receiving areas.

Preferably, the optical unit 4 is so oriented that a division line A perfectly dividing the semi-circular portion of the diffraction grating 5a is disposed substantially perpendicular to a radial direction of the high-density optical disk, and the light source 2 is mounted in such a direction that a direction of a long axis of a far field pattern of the outgoing light is disposed parallel to a radial direction of the high-density optical disk. With such arrangement, the condensed light is condensed parallel to a tangential direction of the optical disk, so that cross talk between tracks is reduced to enable obtaining good reproduction signals. In the embodiment, the light guide means comprises the diffraction grating. The light guide means is not limited to the diffraction grating but may comprise, for example, a light-guiding optical fiber or a laminated optical member.

Next, a reproducing operation of the optical pickup having the above construction will be described. In the embodiment, a compact disk (hereinafter referred to as "CD") is used as an example of a low-density optical disk, and a digital video disk (hereinafter referred to as "DVD") is used as an example of a high-density optical disk.

First, a reproducing operation of the DVD will be described. Light having an oscillation wavelength of 635 to 650 nm and emitted from the light source 2 passes through the light outgoing portion 4d of the optical unit 4 and the diffraction grating 5a to be incident on the beam splitter 10. At least 90% of the light thus incident on the beam splitter 10 is reflected by the beam splitter to outgo therefrom with its optical axis turned about 90 degrees to be incident on the wavelength filer 15 provided adjacent to the beam splitter 10. The wavelength filter 15 is of such a construction that it transmits about 95% or more of the light (for DVD) from the light source 2. The light transmitted through the wavelength filter 15 is incident on the objective lens 16. Then, an image is formed on a recording data layer of the DVD 17 by the condensing effect of the objective lens 16.

Thereafter, the light reflected by the DVD 17 again passes through the objective lens 16 and the wavelength filter 15, and then is reflected by the beam splitter 10 with its optical axis turned toward the optical unit 4 to be incident on the diffraction grating 5a. The light incident on the diffraction grating 5a is diffracted by the three areas 5b, 5c and 5d to be incident respectively on the light-receiving areas formed on the light-receiving element 3.

A relation between the light diffracted by the diffraction grating 5a and the light incident on the light-receiving element 3 will be described. The light (here, primary diffraction light) diffracted by the area 5b of the diffraction grating 5a is incident on the light-receiving area 3a of the light-receiving element 3. As described above, this light-receiving area 3a is divided into four sections A, B, C and D. The light beams incident on the areas 5c and 5d, respectively, are incident on the light-receiving areas 3b and 3c, respectively.

Methods of respectively forming various signals by these incident light beams will be described. An RF signal is formed by the sum of voltage signals converted from current outputs detected by photoelectric conversion of the light beams incident on the light-receiving areas 3a, 3b and 3c formed on the light-receiving element 3.

The so-called hologram Foucault method is used to form a focus error signal from a differential output between a sum of the signals in the areas A and C formed on the light-receiving area 3a and a sum of the signals in the areas B and D, and in accordance with the focus error signal, an actuator holding the objective lens 16 is actuated in a focusing direction. A tracking error signal is formed by using a comparator to convert voltage outputs of the light-receiving areas 3b and 3c, respectively, into digital waveforms, and converting a pulse corresponding to a phase difference between them into an analog waveform through an integrating circuit. In accordance with the tracking error signal, the actuator holding the objective lens 16 is actuated in the tracking direction.

Next, a reproducing action for the CD will be described. Light having an oscillation wavelength of 770 to 790 nm and emitted from the light source 6 passes through the light outgoing portion 8d of the optical unit 8, the beam forming portion 9b and the diffraction grating 9a. At this time, the light, which is formed into three beams by the beam forming portion 9b, is incident on the beam splitter 10. At least 90% of the light incident on the beam splitter 10 transmits through the beam splitter 10 to outgo from the beam splitter 10 to be incident on the wavelength filter 15 provided adjacent to the beam splitter 10. At least about 95% of light for the CD from the light source 6 is reflected by a ring-shaped band formed on an outer peripheral portion of the wavelength filter 15, and at least about 95% of light for the CD from the light source 6 transmits through that portion of the wavelength filter 15, on which the ring-shaped band is not formed in an inner central portion. Therefore, the wavelength filter 15 serves as an iris for correcting the light beam for the CD to control a diameter of the light incident on the objective lens 16. The light transmitting through the wavelength filter 15 is incident on the objective lens 16. Then, an image is formed on the CD 18 by the condensing effect of the objective lens 16.

Thereafter, the light reflected by the CD 18 again passes through the objective lens 16, the wavelength filter 15 and the beam splitter 10 to be incident on the diffraction grating 9a. The light incident on the diffraction grating 9a is diffracted by the two areas 9c and 9d to be incident on the five areas E, F, G, H and I formed on the light-receiving element 7 without interfering with the beam forming portion 9b.

Methods of respectively forming various signals from these incident light beams will be described. The RF signal is formed by the sum of voltage signals converted from current outputs detected by photoelectric conversion of the light beams incident on the light-receiving portions E, F and G formed on the light-receiving element 7. A so-called hologram Foucault method is used to form a focus error signal from a differential output between the areas E and F, and in accordance with the signal, the actuator holding the objective lens 16 is moved in the focusing direction. A so-called three-beam method is used to form a tracking error signal from a differential output between the areas H and I, and in accordance with this signal, the actuator holding the objective lens 16 is moved in the tracking direction.

In this embodiment, the light source for reproduction from the high-density optical disk employs light having a wavelength of around 650 nm, and the light source for reproduction from the low-density optical disk employs light having a wavelength of around 780 nm. However, the invention is not limited to such wavelengths, and for example, the light source for the low-density optical disk can employ light having a wavelength of 650 nm, and the light source for the high-density optical disk can employ light having a wavelength of 400 nm.

Figure 5:
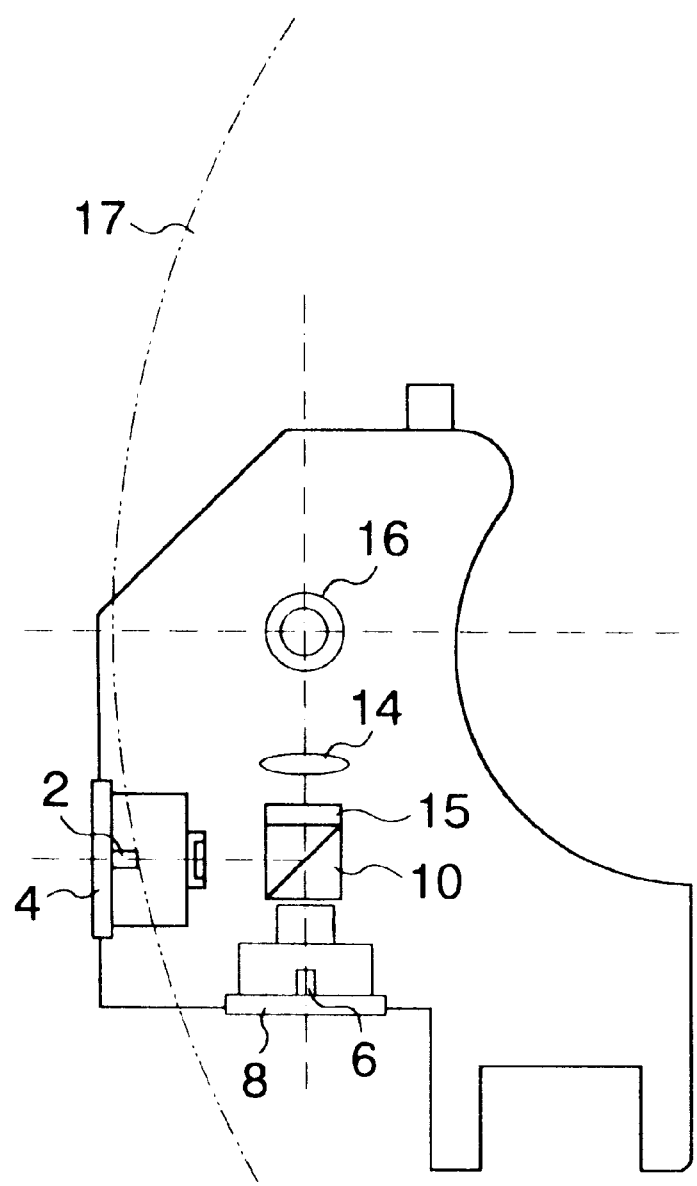
FIG. 5 is a view s h owing a construction of an optical pickup according to a second embodiment of the invention.
Figure 6:
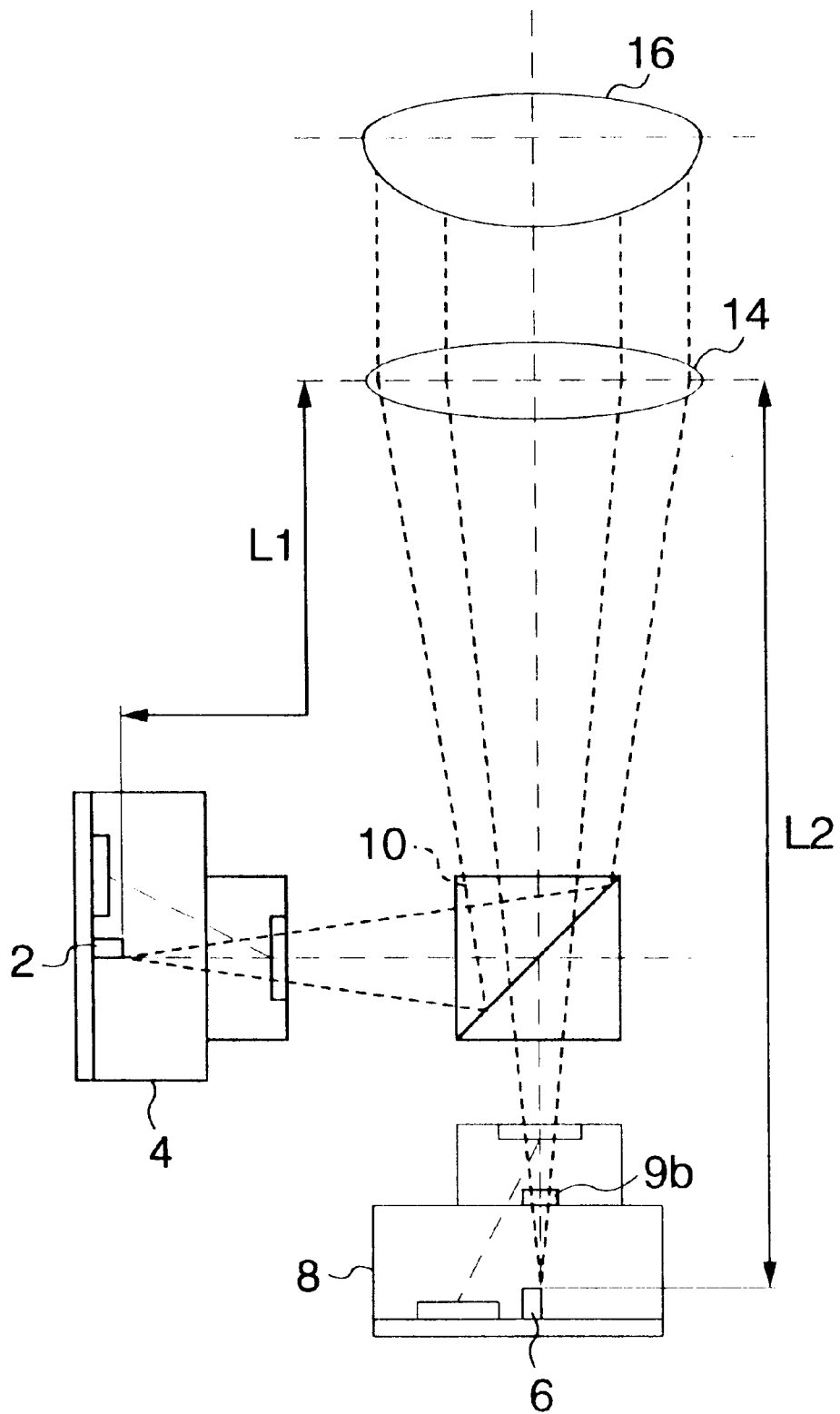
FIG. 6 is a view showing optical path lengths in the optical units of FIG. 5.

Next, a second embodiment of the invention will be described with reference to FIG. 5. FIG. 5 is a view showing a construction of an optical pickup according to a second embodiment of the invention, and FIG. 6 is a view showing optical path lengths in the arrangement of optical units of FIG. 5. In FIGS. 5 and 6, the reference numerals 4 and 8 denote optical units, respectively. The reference numeral 10 denotes a beam splitter, 15 a wavelength filter, and 16 an objective lens. These constituent elements and an arrangement thereof are similar to those of the first embodiment, and therefore these constituent elements are designated by identical reference numerals with detailed explanation omitted.

The second embodiment differs from the first embodiment in that a collimator lens 14 is provided. The collimator lens 14 is provided on a light outgoing side of the beam splitter 10 to be disposed between the wavelength filter 15 and the objective lens 16. In FIG. 6, the collimator lens 14 and the optical unit 4 are so arranged that a light source 2 is positioned at a focal distance of the collimator lens 14 in terms of an optical path length of the air medium, and that a light source 6 is disposed closer to the collimator lens 14 in terms of an air length than is the light source 2. Namely, the following relation in the first embodiment is maintained in the second embodiment provided that the objective lens 16 is replaced by the collimator lens 14:

$$0.55 \leq L2/L1 \leq 0.75$$

As a result, light emitted from the light source 2 is made parallel rays of light after it passes through the collimator lens 14, and light emitted from the light source 6 is reduced in divergent angle after it passes through the collimator lens 14.

The reproducing operation of the optical pickup of the second embodiment having the above construction will be described hereinbelow. First, a reproducing operation for a DVD will be described. Light emitted from the light source 2 passes through a light outgoing portion 4d of the optical unit 4 and a diffraction grating 5a to be incident on the beam splitter 10. At least 90% of the light incident on the beam splitter 10 is reflected by this beam splitter with its optical axis turned about 90 degrees, and goes out of the beam splitter 10 to be incident on the wavelength filer 15 provided adjacent to the beam splitter 10. The wavelength filter 15 is of such a construction that it transmits therethrough not less than 95% of the light (for DVD) from the light source 2. The divergent light having transmitted through the wavelength filter 15 is converted by the collimator lens 14 into parallel rays of light to be incident on the objective lens 16. Then, an image is formed on a recording data layer of the DVD 17 by the condensing effect of the objective lens 16.

Thereafter, the light reflected by the DVD 17 again passes through the objective lens 16, the collimator lens 14 and the wavelength filter 15 to be reflected by the beam splitter 10 with its optical axis turned toward the optical unit 4 to be incident on the diffraction grating 5a. The light incident on the diffraction grating 5a is diffracted by three areas 5b, 5c and 5d, respectively, to be incident on light-receiving portions formed on a light-receiving element 3. Detecting operations and signal reproducing operations of the light-receiving portion, which are to be effected subsequently, are similar to those described above in the first embodiment.

Next, the reproducing operation for a CD will be described. The light emitted from the light source 6 passes through a light outgoing portion 8d of the optical unit 8 and a diffraction grating 9a. At this time, the light formed into three beams by the diffraction grating 9a is incident on the beam splitter 10. At least 90% of the light incident on the beam splitter 10 transmits through the beam splitter 10 to go out of the beam splitter 10 to be incident on the wavelength filter 15 provided adjacent to the beam splitter 10. Substantially not less than 95% of the light (used for the CD) from the light source 6 is reflected by a ring-shaped band formed at an outer peripheral portion of the wavelength filter 15, and transmits through the other portion of the wavelength filter 15 than the ring-shaped band. In this manner, the wavelength filter 15 serves as a diaphragm for correcting the light beam for the CD to control a diameter of the light incident on the objective lens 16. The light having transmitted through the wavelength filter 15 is reduced in divergent angle by the collimator lens 14 to be incident on the objective lens 16. Then, an image is formed on the CD 18 by the condensing effect of the objective lens 16.

Thereafter, the light reflected by the CD 18 again passes through the objective lens 16, the collimator lens 14, the wavelength filter 15 and the beam splitter 10 to be incident on the diffraction grating 9a. The light incident on the diffraction grating 9a is diffracted by two areas 9c and 9d to be incident on five areas E, F, G, H and I formed on a light-receiving element 7. Detecting operations and signal reproducing operations of the light-receiving receiving portion, which are to be effected subsequently, are similar to those described above in the first embodiment.

The invention is not limited to the above construction of the second embodiment, and for example, the collimator lens 14 and the wavelength filter 15 may be exchanged in their positions, and the wavelength filter 15 may be disposed in the optical path between the collimator lens 14 and the objective lens 16 or the wavelength filter 15 may be disposed between the optical unit 8 and the beam splitter 10. Instead of the wavelength filter 15, a diaphragm member (not shown) may be provided between the optical unit 8 and the beam splitter 10 to have an aperture diameter so that the objective lens 16 can operate in a numerical aperture (NA) range of 0.4 to 0.6 with respect to the light from the light source 6. The optical units 4 and 8 may be exchanged in their positions. The wavelength filter 15 and the diaphragm member may be omitted by suitably designing the diffraction grating 9a and the objective lens 16. In this case, the overall construction of the optical pickup is represented by the constituent elements shown in FIG. 6.

In this embodiment, the light source for reproduction from the high-density optical disk employs light having a wavelength of around 650 nm, and the light source for reproduction from the low-density optical disk employs light having a wavelength of around 780 nm. However, the invention is not limited to such wavelengths, and for example, the light source for the low-density optical disk may use light having a wavelength of 650 nm, and the light source for the high-density optical disk may use light having a wavelength of 400 nm.

As described above, in the second embodiment, the aberration correction of the lens can be effected by the collimator lens, so that the optical characteristics of the objective lens can be improved. Besides, the light (for the DVD) from the light source 2 is incident as parallel light rays on the objective lens, so that it is possible to suppress an influence, which movements of the objective lens in the focusing operation and the tracking operation have on the optical characteristics.

Figure 7:
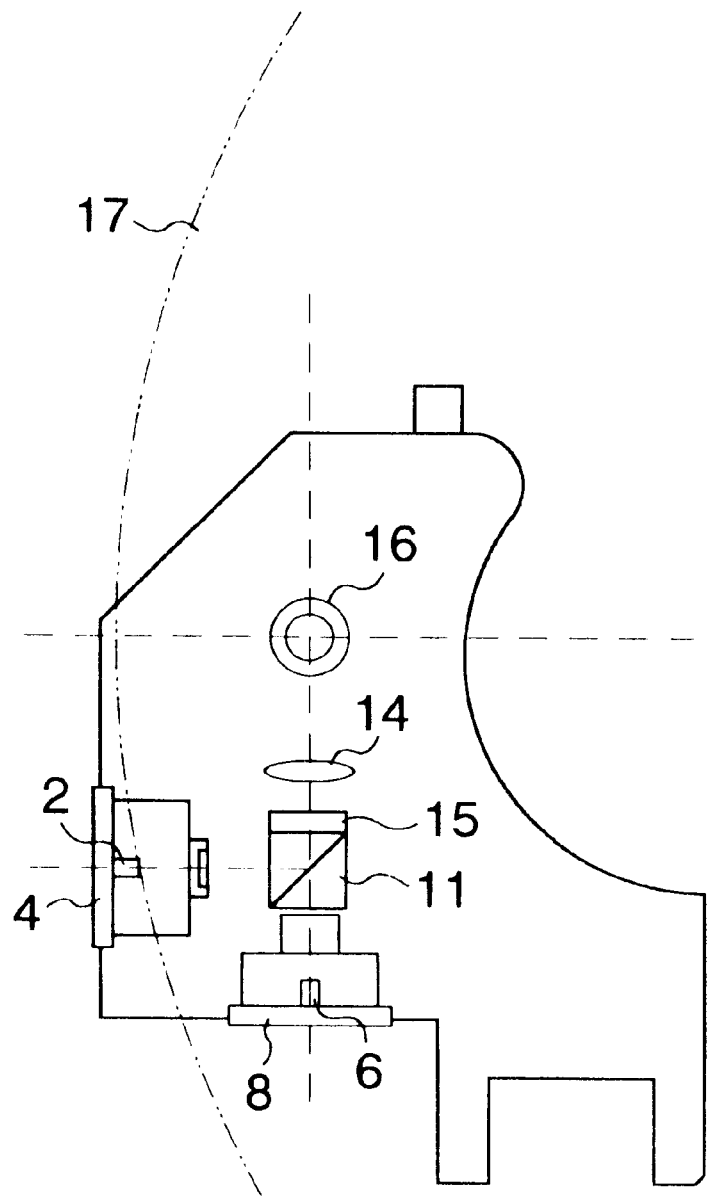
FIG. 7 is a view showing a construction of an optical pickup according to a third embodiment of the invention.

Next, a third embodiment of the invention will be described with reference to FIG. 7. FIG. 7 is a view showing a construction of an optical pickup according to the third embodiment of the invention. In FIG. 7, the reference numerals 4 and 8 denote optical units, respectively. The reference numeral 14 denotes a collimator lens, 15 a wavelength filter, and 16 an objective lens. Since these constituent elements and the arrangement thereof are similar to those of the first and second embodiments, these constituent elements are designated by the same reference numerals, respectively, and detailed explanation thereof will be omitted.

The third embodiment differs from the second embodiment in that there is provided a polarization beam splitter 11. The polarization beam splitter 11 reflects a S polarization component, which is a main component of a laser beam from the light source 2, and transmits therethrough a P polarization component, which is a main component of a laser beam from the light source 6. A center of the polarization beam splitter 11 is disposed on a point of intersection of the laser beams emitted from the optical units 4 and 8, respectively. Requirements for the optical arrangement of the polarization beam splitter 11 and the wavelength filter 15, as well as for the optical arrangement of the collimator lens 14 and the light sources 2 and 6 are similar to those in the second embodiment shown FIG. 6.

The above polarization components are arranged such that the optical unit 4 is so oriented to have a division line (see line A in FIG. 3) of the optical regions disposed substantially perpendicular (that is, tangential) to the direction of the radius of the high-density optical disk. In the case where a semiconductor laser mounted on the optical unit 4 is one having a TE oscillation mode (an oscillatory wave surface is perpendicular to a long axis of a FFP (Far Field Pattern) of the emitted light, for example, a wavelength of the light emitted from the device used in the third embodiment, is not less than 650 nm), the semiconductor laser is mounted such that the long axis of the FFP, which is a main component of the emitted light, is made parallel to a radial direction of the high-density optical disk through the polarization beam splitter 11, the wavelength filter 15 and the collimator lens 14. A semiconductor laser in the optical unit 8 is mounted such that a long axis of a FFP of the emitted light is perpendicular to the radial direction of the optical disk. In this case, the arrangement is such that three beams emitted from the optical unit 8 are perpendicular to the radial direction of the optical disk.

The configurations of the optical units 4 and 8 and the constructions of the detection elements are similar to those described above in the first embodiment. In the optical pickup of the third embodiment having the above construction, both reproducing operations for a DVD and a CD are similar to those in the second embodiment.

The invention is not limited to the above construction of the third embodiment. Thus for example, the collimator lens 14 and the wavelength filter 15 may be exchanged in their positions, and the wavelength filter 15 may be disposed in the optical path between the collimator lens 14 and the objective lens 16. Instead of the wavelength filter 15, a diaphragm member (not shown) may be provided between the optical unit 8 and the polarization beam splitter 11 to have an aperture diameter such that the objective lens 16 can operate in a numerical aperture (NA) range of 0.4 to 0.6 with respect to the light from the light source 6. The optical units 4 and 8 may be exchanged in their positions. These modifications of the constituent elements are similar to those described in the first and second embodiments.

In the third embodiment, the light source for reproduction from the high-density optical disk employs light having a wavelength of around 650 nm, and the light source for reproduction from the low-density optical disk employs light having a wavelength of around 780 nm. However, the invention is not limited to such wavelengths, and for example, the light source for emitting light having a wavelength of 650 nm can be used for the low-density optical disk, and the light source for emitting light having a wavelength of 400 nm can be used for the high-density optical disk.

In the third embodiment, a feature achieved by the use of the collimator lens 14 is obtained as in the second embodiment, and also control of directions of polarization with respect to the light sources enables use of conventional polarization beam splitters. Besides the polarization beam splitter performs transmission and reflection in accordance with the P polarization component and the S polarization component of the light from the light sources, so that the efficiency of light utilization can be enhanced as compared with the case where a half mirror or the like is used. Therefore, the semiconductor lasers for the light sources consume less electric power, which enables use of inexpensive semiconductor lasers and prolongs the lifetime of the semiconductor lasers.

Furthermore, characteristics of polarization caused by the structure of the laser diode device can be utilized for the optical arrangement, so that good reproducing characteristics can be obtained by decreasing crosstalk by having a direction of the long axis of a beam spot corresponding to a circumferential direction (tangential direction) with respect to a DVD, which requires high precision and low crosstalk, and by improving optical characteristics by having a direction of the long axis of a beam spot corresponding to the radial direction with respect to the CD, of which pits are larger than those of the DVD.

If an oscillation mode of the semiconductor laser of the optical unit 4 is a TM mode (for example, wavelength of not more than 645 nm in the case of the device used in the third embodiment), the semiconductor laser is mounted on the optical unit 4 in such a manner that a direction of the long axis of the FFP of the emitted light is perpendicular to the radial direction of the high-density optical disk.

In the above description, the polarization beam splitter 11 effects the S polarization reflection and the P polarization transmittance. However, even if the polarization beam splitter 11 serves as the P polarization reflection and the S polarization transmittance, and the polarization components of the light sources, the polarization beam splitter, the wavelength filter and the collimator lens are reversed in arrangement corresponding to the polarization components, it will be readily appreciated that the operation is effected in a similar manner.

Figure 8:
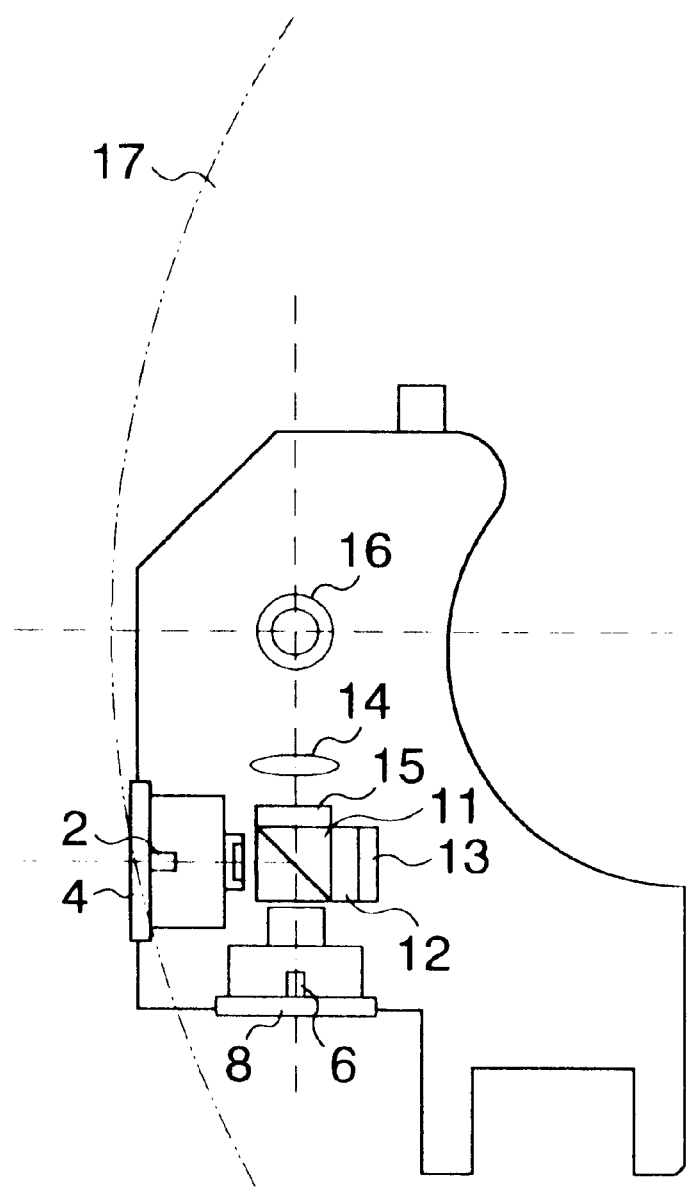
FIG. 8 is a view showing a construction of an optical pickup according to a fourth embodiment of the invention.

A fourth embodiment of the invention will be described with reference to FIG. 8. FIG. 8 is a view showing a construction of an optical pickup according to the fourth embodiment of the invention. In FIG. 8, the reference numerals 4 and 8 denote optical units, respectively. The reference numeral 11 denotes a polarization beam splitter, 14 a collimator lens, 15 a wavelength filter, and 16 an objective lens. Since these constituent elements and the arrangement thereof are similar to those of the first and second embodiments, these constituent elements are designated by the same reference numerals, respectively, and detailed explanation thereof will be omitted.

The fourth embodiment differs from the third embodiment in that there are provided a ¼ wavelength plate 12 and a total reflection mirror 13. The polarization beam splitter 11 transmits therethrough a P polarization component of a laser beam from the light source 2, and reflects a S polarization component of the laser beam. The polarization beam splitter 11 also transmits therethrough a P polarization component of a laser beam from the light source 6. A center of the polarization beam splitter 11 is disposed on a point of intersection of the two laser beams emitted respectively from the optical units 4 and 8.

In FIG. 8, the ¼ wavelength plate 12 and the total reflection mirror 13 are held in intimate contact with each other, but even if they are spaced from each other, their functions are not affected at all.

Requirements for the optical arrangement of an optical path length comprising the light source 2, the beam splitter 11, the ¼ wavelength plate 12, the total reflection mirror 13 (optical path length from the polarization beam splitter 11 to the total reflection mirror 13 and back), the wavelength filter 15 and the collimator lens 14, and an optical path length comprising the light source 6, the polarization beam splitter 11, the wavelength filter 15 and the collimator lens 14 are similar to those in the second embodiment shown FIG. 6.

Requirements for the orientation of the optical unit 4 and the arrangement of semiconductor lasers are similar to those in the third embodiment.

Configurations of the optical units 4 and 8 and constructions of the detection elements are similar to those described above in the first embodiment. In the optical pickup of the fourth embodiment having the above construction, the reproducing operations for a DVD and for a CD are similar to those in the second embodiment.

The operation of the fourth embodiment will now be described with reference to FIG. 8. First, the reproducing operation for a DVD will be described. Light having a P polarization component as a main component and emitted from the light source 2 is incident on the polarization beam splitter 11. The polarization beam splitter 11 transmits therethrough the P polarization component of the incident light, and then the light is incident on the ¼ wavelength plate 12 to be converted into circularly-polarized light while passing through this ¼ wavelength plate 12. Then, immediately after going out of the ¼ wavelength plate 12, the light is totally reflected by the total reflection mirror 13 to be again incident on the ¼ wavelength plate 12. While passing through the ¼ wavelength plate 12, the light is converted into S-polarized and linearly-polarized light. Then, the polarization beam splitter 11 reflects the S-polarized light to turn its optical axis about 90 degrees to permit the light to go out of the polarization beam splitter 11. Thereafter, the light passes through the wavelength filter 15, the collimator lens 14 and the objective lens 16 to form an image on a recording data layer of the DVD 17, as described above in the second embodiment.

The light reflected by the DVD 17 again passes through the objective lens 16, the collimator lens 14 and the wavelength filter 15 to be reflected by the polarization beam splitter 11, and to reciprocate between the polarization beam splitter 11 and the total reflection mirror 13 through the ¼ wavelength plate 12. As a result, the light is converted into P-polarized and linearly-polarized light to transmit through the polarization beam splitter 11 to be incident on the optical unit 4. Detecting operations of a light-receiving portion of the optical unit 4 and signal reproducing operations, which are to be effected subsequently, are similar to those described above in the first embodiment.

Next, the reproducing operation for a CD will be described. The light having a P polarization component as a main component and emitted from the light source 6 is incident on the polarization beam splitter 11. The polarization beam splitter 11 transmits therethrough the incident P polarization component, and then the light passes through the wavelength filter 15, the collimator lens 14 and the objective lens 16 to form an image on a recording layer of the CD 18, as described above in the second embodiment.

The light reflected by the CD 18 again passes through the objective lens 16, the collimator lens 14, the wavelength filter 15 and the polarization beam splitter 11. Detecting operations of a light-receiving portion and signal reproducing operations, which are to be effected subsequently, are similar to those described above in the first embodiment.

In the fourth embodiment, while the polarization beam splitter 11 is used, a half mirror may be used instead of the polarization beam splitter 11 if light loss is permissible.

The invention is not limited to the above construction of the fourth embodiment, and for example, the collimator lens 14 and the wavelength filter 15 may be exchanged in their positions, and may be disposed in the optical path between the collimator lens 14 and the objective lens 16. Instead of the wavelength filter 15, a diaphragm member (not shown) may be provided between the optical unit 8 and the polarization beam splitter 11 to have such an aperture diameter that the objective lens 16 can operate in a numerical aperture (NA) range of 0.4 to 0.6 with respect to the light from the light source 6. The optical units 4 and 8 may be exchanged in their positions. These modifications of the constituent elements are similar to those described in the first and second embodiments.

In this embodiment, the light source for reproduction from the high-density optical disk employs light having a wavelength of around 650 nm, and the light source for reproduction from the low-density optical disk employs light having a wavelength of around 780 nm. However, the invention is not limited to such wavelengths, and for example, light having with a wavelength of 650 nm can be used in the light source for the low-density optical disk, and light having a wavelength of 400 nm can be used in the light source for the high-density optical disk.

In the above description, the polarization beam splitter 11 serves as the S polarization reflection and the P polarization transmission. However, it will be readily appreciated that even if the polarization beam splitter 11 serves as the P polarization reflection and the S polarization transmission, and the polarization components of the lights from the light sources, as well as the arrangement of the polarization beam splitter, the wavelength filter, the collimator lens, the ¼ wavelength plate and the total reflection mirror are reversed in arrangement corresponding to the polarization components, the operation is effected in a similar manner.

The fourth embodiment has a feature attributable to the use of the collimator lens 14 like the second embodiment, and also a feature of an improved efficiency of utilization of the light attributable to the use of a conventional polarization beam splitter like the third embodiment.

In the fourth embodiment, as is clear from the comparison between FIGS. 6 and 7, the optical path length obtained by spacing the optical unit 4 and the polarization beam splitter 11 from each other can be replaced by the optical path length between the polarization beam splitter 11 to the total reflection mirror 13. As a result, the optical unit 4 and the polarization beam splitter 11 can be disposed sufficiently close to each other, so that the optical pickup module using the fourth embodiment can be more reduced in outer size in its radial direction.

Figure 9:
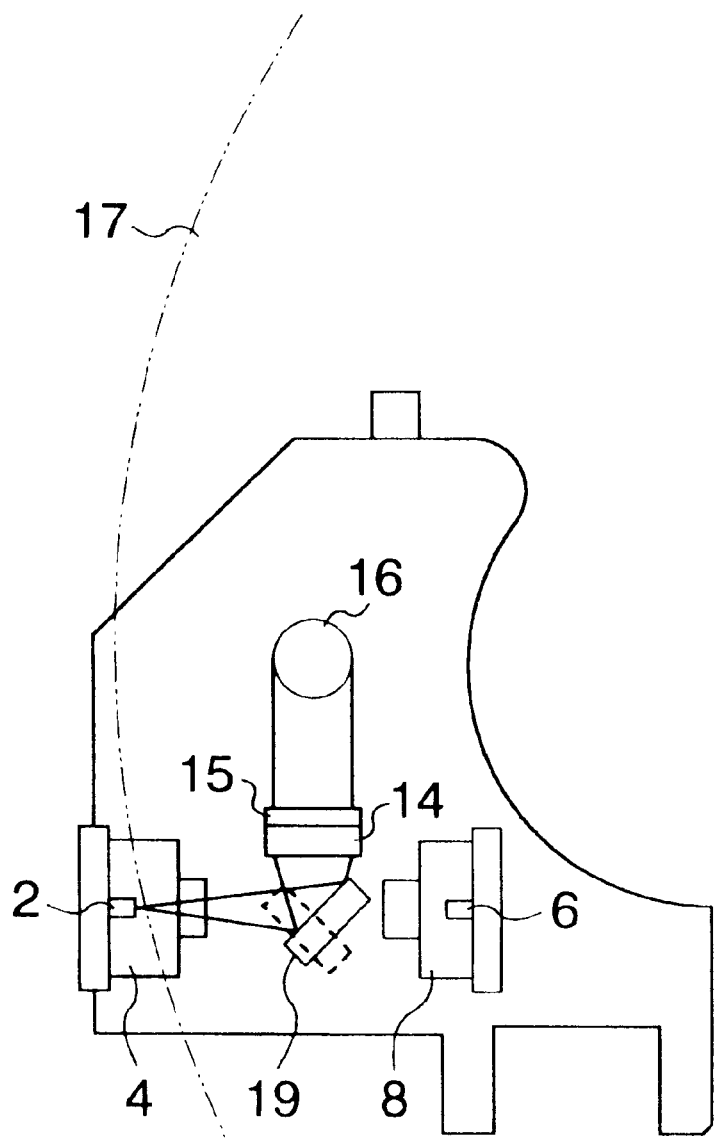
FIG. 9 is a plan view of an optical pickup according to a fifth embodiment of the invention during operation of a DVD.

Next, a fifth embodiment of the invention will be described with reference to FIGS. 9 and 10. FIG. 9 is a plan view of an optical pickup according to the fifth embodiment of the invention during the operation of a DVD, and FIG. 10 is a plan view of the optical pickup of the fifth embodiment during the operation of a CD.

Figure 10:
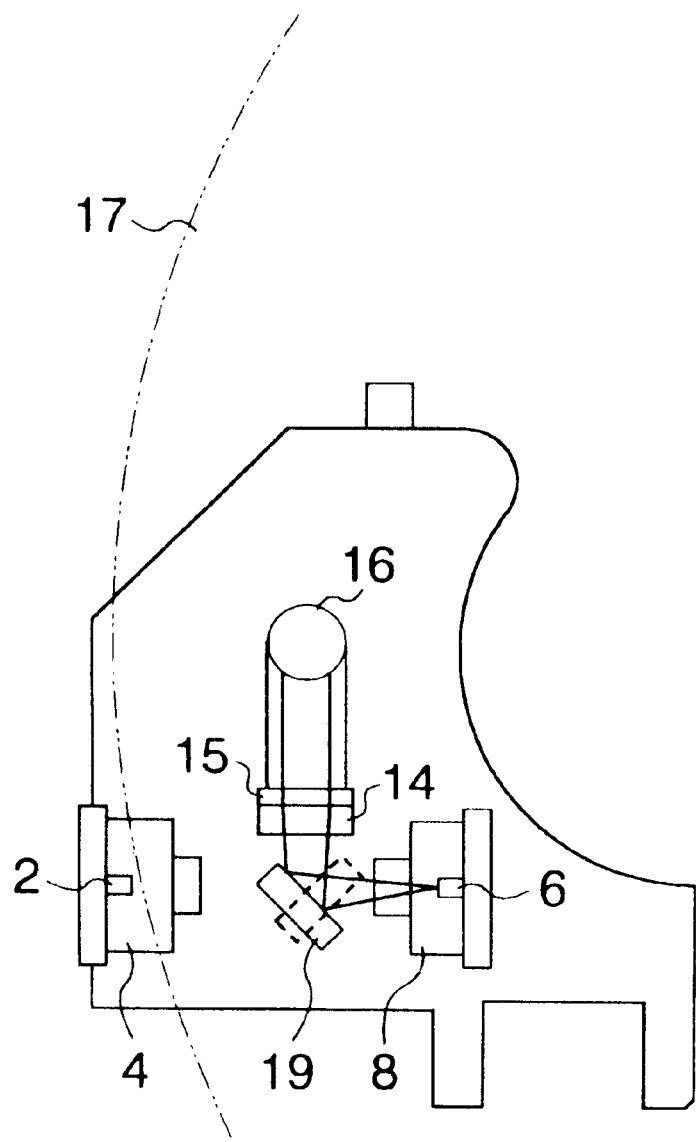
FIG. 10 is a plan view of the optical pickup of the fifth embodiment during operation of a CD.

In FIGS. 9 and 10, the reference numerals 2 and 6 denote light sources, respectively, 4 and 8 optical units, respectively, 14 a collimator lens, 15 a wavelength filter, and 16 an objective lens. As these constituent elements are similar to those of the first to fourth embodiments, they are designated by the same reference numerals, respectively, and detailed explanation thereof will be omitted.

The optical unit 4 and the optical unit 8 are disposed in opposed relation to each other with an optical axis of the collimator lens 14 central therebetween. A relationship between an optical path length from the light source 2 to the collimator lens 14 and an optical path length from the light source 6 to the collimator lens 14 is established in the same manner as described above in the second embodiment and in FIG. 6.

A total reflection mirror 19 having a multi-layer coating is turnably supported by a turning means (not shown). An axis, about which the turning means turns, passes through a point of intersection of the optical axes of the light source 2, the light source 6 and the collimator lens 14, and a center of a reflecting surface of the total reflection mirror 19 can turn 45 degrees from the above intersection point toward the light source 2 and toward the light source 6. The turning means comprises a mechanism for turning through 90 degrees, which employs elements such as a rotary solenoid, a stepping motor, or a linkage. As the turning mechanism can be realized by mechanisms of conventional techniques, detailed description thereof is omitted here.

An operation of the fifth embodiment will now be described with reference to FIG. 9. First, reproduction from a DVD will be described. In accordance with the operation of the DVD, the total reflection mirror 19 is beforehand turned 45 degrees toward the optical unit 4 (the solid line position in FIG. 9). Light emitted from the light source 2 is incident on the total reflection mirror 19. The total reflection mirror 19 having the multi-layer coating totally reflects the light to turn the optical axis of the light 90 degrees to permit the light to be incident on the collimator lens 14.

Then, the light passes through the collimator lens 14, the wavelength filter 15 and the objective lens 16 to form an image on a recording date layer of the DVD 17, as described above in the second embodiment.

The light reflected by the DVD 17 again passes through the objective lens 16, the wavelength filter 15 and the collimator lens 14 to be reflected by the total reflection mirror 19 to be incident on the optical unit 4. Detecting operations of a light-receiving portion of the optical unit 4 and signal reproducing operations, which are to be effected subsequently, are similar to those described above in the first embodiment.

Next, the reproducing operation for a CD will be described with reference to FIG. 10. In accordance with the operation of the CD, the total reflection mirror 19 is beforehand turned at an angle of 45 degrees toward the optical unit 8. Light emitted from the light source 6 is incident on the total reflection mirror 19. The total reflection mirror 19 having the multi-layer coating totally reflects the light to turn the optical axis of the light about 90 degrees, and then the light is incident on the collimator lens 14. Then, the light passes through the collimator lens 14, the wavelength filter 15 and the objective lens 16 to form an image on a recording data layer of the CD 18, as described above in the second embodiment.

The light reflected by the CD 18 again passes through the objective lens 16, the wavelength filter 15 and the collimator lens 14 to be reflected by the total reflection mirror 19 to be incident on the optical unit 8. Detecting operations of a light-receiving portion of the optical unit 8 and signal reproducing operations, which are to be effected subsequently, are similar to those described above in the first embodiment.

As described above, in the fifth embodiment of the invention, the optical system can be switched by turning the total reflection mirror 19 through 90 degrees, and moreover use of the total reflection mirror 19 eliminates light loss due to the switching. Therefore, the efficiency of utilization of the light can be enhanced whereby semiconductor lasers constituting the respective light sources consume less electric power, inexpensive semiconductor lasers can be used, and the semiconductor lasers can be increased in lifetime.

Since the optical unit 4 and the optical unit 8 are disposed in opposed relation to each other, the optical unit 8 can be mounted in an excess space for a spindle motor to improve space utilization, and an outer size of a carriage in a direction perpendicular to the radial direction of the optical disk can be reduced to realize a more compact optical disk drive unit.

In the embodiment, the total reflection mirror 19 is turned 90 degrees by the turning means but the invention is not limited to such requirement of action. For example, the angle of turning may be acute or obtuse, and the turning means is not limited to a circular motion but may perform a combination of a circular motion and a parallel motion. An example of such turning means will be described below with reference to FIGS. 11 and 12.

Figure 11:
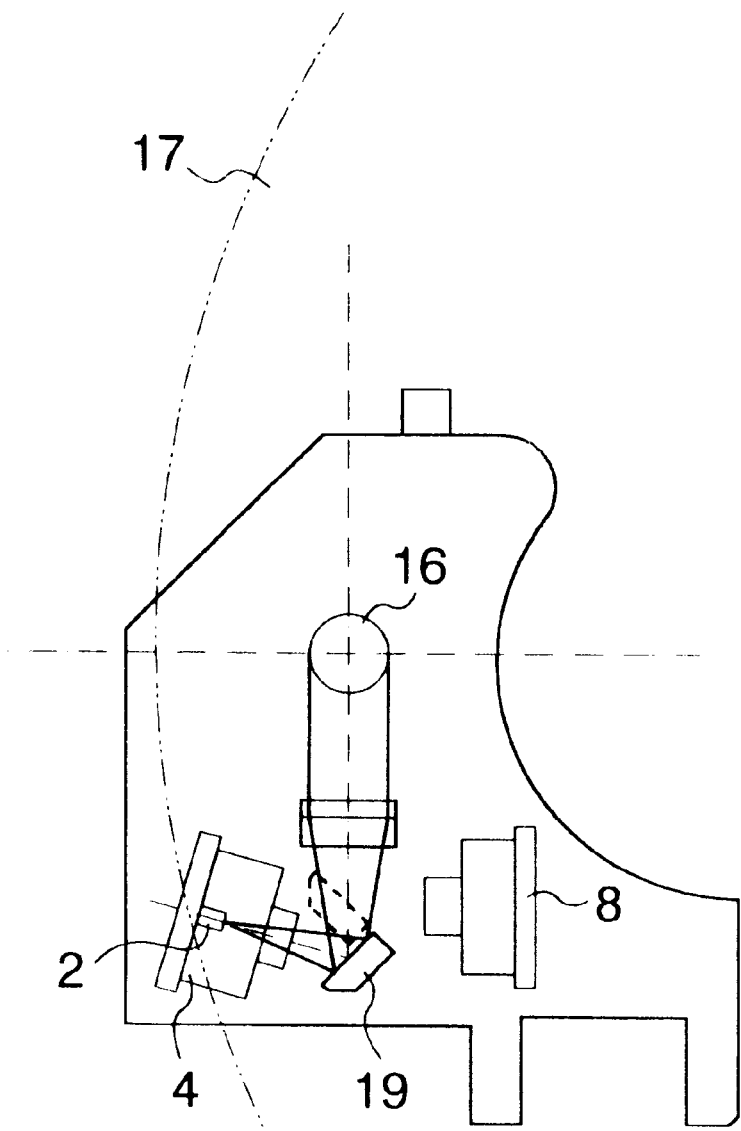
FIG. 11 is a plan view of the fifth embodiment , using modified angularly-moving means, during operation of a DVD.
Figure 12:
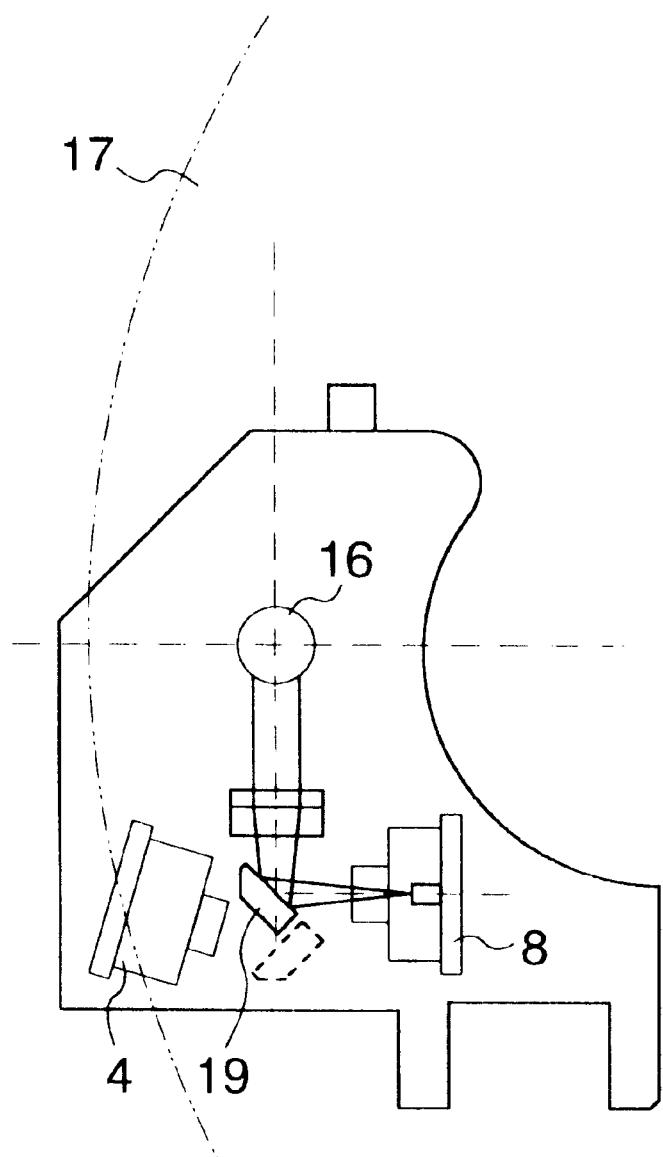
FIG. 12 is a plan view of this fifth embodiment during operation of a CD.
Figure 13:
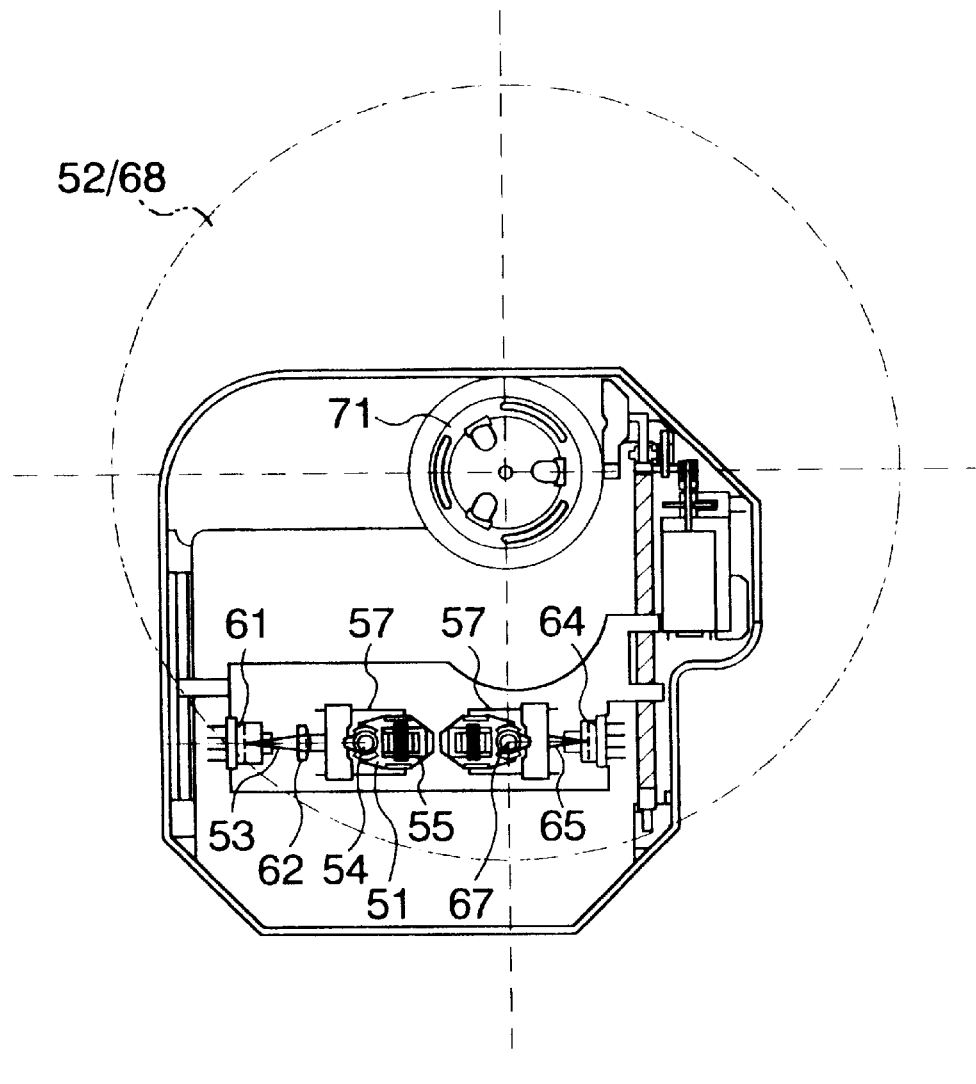
FIG. 13 shows a plan view of a conventional optical pickup, and a cross-sectional view of an essential portion thereof.
Figure 13:
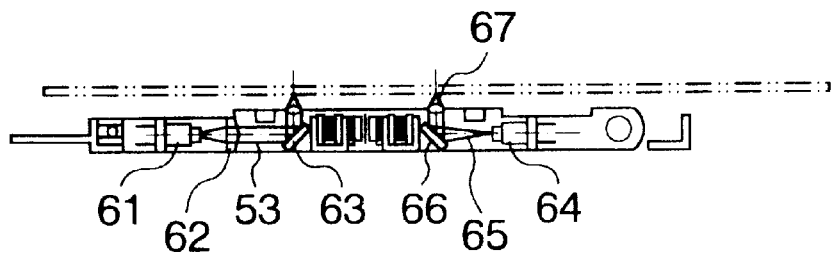

FIG. 11 is a plan view of the fifth embodiment, showing an operation of a DVD by the use of other turning means, and FIG. 12 is a plan view of the fifth embodiment, showing an operation of a CD by the use of other turning means. In FIGS. 11 and 12, the reference numerals 2 and 6 denote light sources, respectively, 4 and 8 optical units, respectively, 14 a collimator lens, 15 a wavelength filter, and 16 an objective lens. In FIGS. 11 and 12, particularly as compared with FIGS. 9 and 10, the optical unit 4 is inclined at an acute angle relative to the optical axis of the collimator lens 14, and is disposed closer to the optical axis of the collimator lens 14. As compared with FIGS. 9 and 10, a total reflection mirror 19 corresponding to the optical unit 4 is turned an angle less than 45 degrees relative to the optical unit 4 to be disposed farther from the collimator lens 14 (such position will be referred to as "DVD position") as in FIG. 11.

The optical unit 8 is disposed at the same position as that shown in FIG. 10, and the total reflection mirror 19 corresponding to the optical unit 8 is turned an angle of 45 degrees relative to the optical unit 8 to be disposed farther from the collimator lens 14 (such position will be referred to as "CD position") as in FIG. 10. Namely, the total reflection mirror 19 is turned an angle of less than 90 degrees between the DVD position and the CD position while reciprocating between positions near and distant from the collimator lens 14. Therefore, relationships between an optical path length from the light source 2 to the collimator lens 14 and an optical path length from the light source 6 to the collimator lens 14 are established in the same manner as described above in the second embodiment shown in FIG. 6. Turning means for turning the total reflection mirror 19 can be constituted by a conventional technique such as a link mechanism as described above, and therefore detailed description thereof is omitted here.

These constituent elements are the same as those of the above-mentioned fifth embodiment and therefore are designated by the same reference numerals, respectively, and explanation thereof will be omitted.

The operation of the other turning means of the above construction will now be described. First, the operation for the DVD will be described with reference to FIG. 11. In accordance with the operation of the DVD, the total reflection mirror 19 is beforehand turned an acute angle and moved toward the optical unit 4 (the DVD position). Light emitted from the light source 2 is incident on the total reflection mirror 19. The total reflection mirror 19 having a multi-layer coating totally reflects the light to turn the optical axis of the light about 90 degrees, and then the light is incident on the collimator lens 14. Then, the light passes through the collimator lens 14, the wavelength filter 15 and the objective lens 16 to form an image on a recording data layer of the DVD 17, as described above in the second embodiment.

The light reflected by the DVD 17 again passes through the objective lens 16, the wavelength filter 15 and the collimator lens 14 to be reflected by the total reflection mirror 19 to be incident on the optical unit 4. Detecting operations of a light-receiving portion of the optical unit 4 and signal reproducing operations, which are to be effected subsequently, are similar to those described above in the first embodiment.

Next, the reproducing operation for a CD will be described with reference to FIG. 12. In accordance with the operation of the CD 18, the total reflection mirror 19 is beforehand turned an angle of 45 degrees and moved toward the optical unit 8 (the CD position). Light emitted from the light source 6 is incident on the total reflection mirror 19. The total reflection mirror 19 having the multi-layer coating totally reflects the light to turn the optical axis of the light about 90 degrees, and then the light is incident on the collimator lens 14. Then, the light passes through the collimator lens 14, the wavelength filter 15 and the objective lens 16 to form an image on a recording data layer of the CD 18, as described in the second embodiment.

The light reflected by the CD 18 again passes through the objective lens 16, the wavelength filter 15 and the collimator lens 14 to be reflected by the total reflection mirror 19 to be incident on the optical unit 8. Detecting operations of a light-receiving portion of the optical unit 8 and signal reproducing operations, which are to be effected subsequently, are similar to those described above in the first embodiment.

As described above, the other turning means in this embodiment uses the total reflection mirror 19 to eliminate light loss due to the switching, as in the above fifth embodiment. Therefore, it is possible to enhance the efficiency of utilization of the light and use semiconductor lasers, which consume less electric power and are inexpensive. Also, the lifetime of the semiconductor lasers can be increased.

Since the optical unit 8 is disposed perpendicular to the optical axis of the collimator lens 14, it can be mounted in an excess space for a spindle motor to improve the utilization of space. Since the optical unit 4 is inclined and disposed close to the collimator lens 14, the outer size of a carriage in a direction perpendicular to the radial direction of the optical disk can be reduced as described above, and the outer size in the radial direction can be reduced as in the fourth embodiment, so that a more compact optical disk drive unit can be realized.

The wavelength filter 15 and the collimator lens can be changed in their positions as described above in the first and second embodiments, and therefore explanation thereof is omitted.

As described above, in the present invention, the optical pickup comprises two optical units and one optical system, and the two optical units use the one optical system in common. Accordingly, the optical disks of different recording densities can be recorded and reproduced, and there can be provided a small-sized, thin, low power-consumption optical pickup.

What is claimed is:

1. An optical pickup for reproducing information from an optical disk recording medium, comprising:

a first light source for emitting light of a first wavelength;

a first photodetector for detecting light reflected from the optical disk;

a second light source for emitting light having a second wavelength, said first wavelength being shorter than said second wavelength;

a second photodetector for detecting light reflected from the optical disk;

light splitting means for guiding the light having the first wavelength and the light having the second wavelength to generally a same optical axis; and an objective lens, wherein:

an optical axis of said first light source intersects said same optical axis, an optical axis of said second light source is disposed on a line of extension of said same optical axis, and the following relationship is established:

$$L1 > L2$$

where L1 represents an optical distance from said first light source to said objective lens, and L2 represents an optical distance from said second light source to said objective lens.

2. An optical pickup according to claim 1, wherein said light splitting means is a beam splitter which reflects the light having the first wavelength and transmits therethrough the light having the second wavelength.

3. An optical pickup according to claim 1, wherein an optical distance from said first light source to said objective lens and an optical distance from said second light source to said objective lens are different such that a spherical aberration produced when the light having the first wavelength transmits through said objective lens to be condensed and a spherical aberration produced when the light having the second wavelength transmits through said objective lens to be condensed are not more than predetermined values, respectively.

4. An optical pickup according to claim 1, wherein $$0.55 \leq L2/L1 \leq 0.75.$$

5. An optical pickup according to claim 1, wherein said first light source and said first photodetector are provided in a first optical unit and said second light source and said second photodetector are provided in a second optical unit.

6. An optical pickup for reproducing information from an optical disk recording medium, comprising:

a first light source for emitting light having a first wavelength;

a first photodetector for detecting light reflected from the optical disk;

first light guide means for guiding light reflected from the optical disk to said first photodetector;

a second light source for emitting light having a second wavelength, said first wavelength being shorter than said second wavelength;

a second photodetector for detecting light reflected from the optical disk;

second light guide means for guiding light reflected from the optical disk to said second photodetector;

light splitting means for guiding the light having the first wavelength and the light having the second wavelength to generally the same optical axis; and an objective lens, wherein:

an optical axis of said first light source intersects said same optical axis, an optical axis of said second light source is disposed on a line of extension of said same optical axis, said light splitting means is disposed at a position including a point of intersection of the optical axes of said first and second light sources, and the following relationship is established:

L1>L2 where L1 represents an optical distance from said first light source to said objective lens, and L2 represents an optical distance from said second light source to said objective lens.

7. An optical pickup according to claim 6, wherein said light splitting means is a beam splitter which reflects the light having the first wavelength and transmits therethrough the light having the second wavelength.

8. An optical pickup according to claim 6, wherein the following relationship is established:

0.55≦L2/L1<0.75.

9. An optical pickup according to claim 6, further comprising beam diameter change means having different transmitting beam diameters for the light having the first wavelength and a laser beam having the second wavelength, respectively, and wherein the transmitting beam diameters are set such that said objective lens operates in a numerical aperture (NA) range of 0.4 to 0.6 with respect to the light having the second wavelength, and said beam diameter change means is provided between said light splitting means and said objective lens.

10. An optical pickup according to claim 6, further comprising beam diameter change means having different transmitting beam diameters for the light having the first wavelength and a laser beam having the second wavelength, respectively, and wherein the transmitting beam diameters are set such that said objective lens operates in a numerical aperture (NA) range of 0.4 to 0.6 with respect to the light having the second wavelength, and said beam diameter change means is provided between said second light source and said light splitting means.

11. An optical pickup according to claim 6, wherein said optical axis of said first light source perpendicularly intersects said same optical axis.

12. An optical pickup according to claim 6, wherein said first light source, said first photodetector and said first light guide means are provided in a first optical unit, and said second light source, said second photodetector and said second light guide means are provided in a second optical unit.

13. An optical pickup for reproducing information from an optical disk recording medium comprising:

a first light source for emitting light having a first wavelength;

a first photodetector for detecting light reflected from the optical disk;

first light guide means for guiding light reflected from the optical disk to said first photodetector;

a second light source for emitting light having a second wavelength, said first wavelength being shorter than said second wavelength;

a second photodetector for detecting light reflected from the optical disk;

second light guide means for guiding light reflected from the optical disk to said second photodetector;

light splitting means for guiding the light having the first wavelength and the light having the second wavelength to generally the same optical axis;

a collimator lens for converting the light having the first wavelength from divergent light beams into parallel light beams and for reducing an angle of divergence of the light having the second wavelength; and an objective lens, wherein:

said collimator lens is disposed between said light splitting means and said objective lens, an optical axis of said second light source is disposed on a line of extension of said same optical axis, an optical axis of said first light source intersects said same optical axis, said light splitting means is disposed at a position including a point of intersection of the optical axes of said first and second light sources, and the following relationship is established:

L1>L2 where L1 represents an optical distance from said first light source to said collimator lens, and L2 represents an optical distance from said second light source to said collimator lens.

14. An optical pickup according to claim 13, wherein said light splitting means is a beam splitter which reflects the light having the first wavelength and transmits therethrough the light having the second wavelength.

15. An optical pickup according to claim 13, wherein the following relationship is established:

0.55≦L2/L1≦0.75.

16. An optical pickup according to claim 13, wherein said optical axis of said first light source perpendicularly intersects said same optical axis.

17. An optical pickup according to claim 13, wherein said first light source, said first photodetector and said first light guide means are provided in a first optical unit, and said second light source, said second photodetector and said second light guide means are provided in a second optical unit.

18. An optical pickup for reproducing information from an optical disk recording medium, comprising:

a first light source for emitting light having a first wavelength;

a first photodetector for detecting light reflected from the optical disk;

first light guide means for guiding light reflected from the optical disk to said first photodetector;

a second light source for emitting light having a second wavelength, said first wavelength being shorter than said second wavelength;

a second photodetector for detecting light reflected from the optical disk;

second light guide means for guiding light reflected from the optical disk to said second photodetector;

polarization beam splitter means for guiding the light having the first wavelength and the light having the second wavelength to generally the same optical axis;

beam diameter change means having different transmitting beam diameters for the light having the first wavelength and the light having the second wavelength, respectively, a collimator lens for converting the light having the first wavelength from divergent light beams into parallel light beams for reducing an angle of divergence of the light having the second wavelength; and an objective lens, wherein:

said collimator lens is disposed between said polarization beam splitter means and said objective lens, an optical axis of said second light source is disposed on a line of extension of said same optical axis, an optical axis of said first light source intersects said same optical axis, said polarization beam splitter means is disposed at a position including a point of intersection of the optical axes of said first and second light sources, and the following relationship is established:

L1>L2 where L1 represents an optical distance from said first light source to said collimator lens, and L2 represents an optical distance from said second light source to said collimator lens.

19. An optical pickup according to claim 18, wherein said polarization beam splitter means is a polarization beam splitter adapted to reflect a S polarization component and to transmit therethrough a P polarization component, and wherein said first light source emits the S-polarized light, and said second light source emits the P-polarized light.

20. An optical pickup according to claim 18, wherein said polarization beam splitter means is a polarization beam splitter adapted to reflect a P polarization component and to transmit therethrough a S polarization component, and wherein said first light source emits the P-polarized light, and said second light source emits the S-polarized light.

21. An optical pickup according to claim 18, wherein the following relationship is established:

0.55≦L2/L1≦0.75.

22. An optical pickup according to claim 18, wherein said beam diameter change means is an iris member set such that said objective lens operates in a numerical aperture (NA) range of 0.4 to 0.6 with respect to the light having the second wavelength, and said beam diameter change means is provided between said polarization beam splitter means and said objective lens.

23. An optical pickup according to claim 18, wherein said beam diameter change means is an iris member set such that said objective lens operates in a numerical aperture (NA) range of 0.4 to 0.6 with respect to the light having the second wavelength, and said beam diameter change means is provided between said second light source and said polarization beam splitter means.

24. An optical pickup according to claim 18, wherein said optical axis of said first light source perpendicularly intersects said same optical axis.

25. An optical pickup according to claim 18, wherein said first light source, said first photodetector and said first light guide means are provided in a first optical unit, and said second light source, said second photodetector and said second light guide means are provided in a second optical unit.

26. An optical pickup for reproducing information from an optical disk recording medium, comprising:

a first light source for emitting light having a first wavelength;

a first photodetector for detecting light reflected from the optical disk;

first light guide means for guiding light reflected from the optical disk to said first photodetector;

a second light source for emitting light having a second wavelength, said first wavelength being shorter than said second wavelength;

a second photodetector for detecting light reflected from the optical disk;

second light guide means for guiding light reflected from the optical disk to said second photodetector;

light splitting means including a polarization beam splitter for guiding the light having the first wavelength and the light having the second wavelength to generally the same optical axis, a ¼ wavelength plate, and a total reflection mirror;

beam diameter change means having different transmitting beam diameters for the light having the first wavelength and the light having the second wavelength, respectively, a collimator lens for converting the light having the first wavelength from divergent light beams into parallel light beams and for reducing an angle of divergence of the light having the second wavelength; and an objective lens, wherein:

said collimator lens is disposed between said light splitting means and said objective lens, an optical axis of said first light source intersects said same optical axis, said light splitting means is disposed at a position including a point of intersection of the optical axes of said first and second light sources, and the following relationship is established:

L1>L2 where L1 represents an optical distance from said first light source to said collimator lens through said ¼ wavelength plate and said total reflection mirror, and L2 represents an optical distance from said second light source to said collimator lens.

27. An optical pickup according to claim 26, wherein said polarization beam splitter of said light splitting means is adapted to reflect a S polarization component and to transmit a P polarization component, and said ¼ wavelength plate is arranged in a position where the light having the first wavelength and transmitting through said polarization beam splitter is incident, and wherein said total reflection mirror is arranged in a position where the light having the first wavelength and transmitting through said ¼ wavelength plate is incident, and each of said first and second light sources emits the P-polarized light.

28. An optical pickup according to claim 26, wherein said polarization beam splitter of said light splitting means is adapted to reflect a P polarization component and to transmit a S polarization component, and said ¼ wavelength plate is arranged in a position where the light having the first wavelength and transmitting through said polarization beam splitter is incident, and wherein said total reflection mirror is arranged in a position where the light having the first wavelength and transmitting through said ¼ wavelength plate is incident, and each of said first and second light sources emits the S-polarized light.

29. An optical pickup according to claim 26, wherein the following relationship is established:

$$0.55 \leq L2/L1 \leq 0.75.$$

30. An optical pickup according to claim 26, wherein said beam diameter change means is an iris member set such that said objective lens operates in a numerical aperture (NA) range of 0.4 to 0.6 with respect to the light having the second wavelength, and said beam diameter change means is provided between said light splitting means and said objective lens.

31. An optical pickup according to claim 26, wherein said beam diameter change means is an iris member set such that said objective lens operates in a numerical aperture (NA) range of 0.4 to 0.6 with respect to the light having the second wavelength, and said beam diameter change means is provided between said second light source and said light splitting means.

32. An optical pickup according to claim 26, wherein said optical axis of said first light source perpendicularly intersects said same optical axis.

33. An optical pickup according to claim 26, wherein said first light source, said first photodetector and said first light guide means are provided in a first optical unit, and said second light source, said second photodetector and said second light guide means are provided in a second optical unit.

34. An optical pickup according to claim 26, wherein an optical axis of said second light source is disposed on a line of extension of said same optical axis.

35. An optical pickup for reproducing information from an optical disk recording medium, comprising:
   a first light source for emitting light having a first wavelength;
   a first photodetector for detecting light reflected from the optical disk;
   first light guide means for guiding light reflected from the optical disk to said first photodetector;
   a second light source for emitting light having a second wavelength, said first wavelength being shorter than said second wavelength;
   a second photodetector for detecting light reflected from the optical disk;
   second light guide means for guiding light reflected from the optical disk to said second photodetector;
   light splitting means for selectively guiding the light having the first wavelength and the light having the second wavelength to generally the same optical axis;
   beam diameter change means having different transmitting beam diameters for the light having the first wavelength and the light having the second wavelength, respectively,
   a collimator lens for converting the light having the first wavelength from divergent light beams into parallel light beams and for reducing an angle of divergence of the light having the second wavelength; and
   an objective lens; wherein:
      an optical axis of said second light source intersects said same optical axis,
      said light splitting means is disposed at a position including a point of intersection of said same optical axis and the optical axis of said second light source, and
      the following relationship is established:

$$L1 > L2$$

where L1 represents an optical distance from said first light source to said collimator lens, and L2 represents an optical distance from said second light source to said collimator lens.

36. An optical pickup according to claim 35, wherein an optical axis of said first light source perpendicularly intersects said same optical axis, and said light splitting means is a pivotably supported total reflection mirror, of which an axis of turning is disposed at a point of intersection of said same optical axis and the optical axes of said first and second light sources, and wherein said total reflection mirror is turned 45 degrees toward said first light source and toward said second light source, respectively.

37. An optical pickup according to claim 35, wherein an optical axis of said first light source intersects at an acute angle said same optical axis, and said light splitting means is a pivotably and rectilinearly movable total reflection mirror.

38. An optical pickup according to claim 36 or claim 37, wherein the following relationship is established:

$$0.55 \leq L2/L1 \leq 0.75.$$

39. An optical pickup according to claim 36 or claim 37, wherein said beam diameter change means is an iris member set such that said objective lens operates in a numerical aperture (NA) range of 0.4 to 0.6 with respect to the light having the second wavelength, and said beam diameter change means is disposed between said light splitting means and said objective lens.

40. An optical pickup according to claim 36 or claim 37, wherein said beam diameter change means is an iris member set such that said objective lens operates in a numerical aperture (NA) range of 0.4 to 0.6 with respect to the light having the second wavelength, and said beam diameter change means is disposed between said second light source and said light splitting means.

41. An optical pickup according to claim 35, wherein said optical axis of said first light source perpendicularly intersects said same optical axis.

42. An optical pickup according to claim 35, wherein said first light source, said first photodetector and said first light guide means are provided in a first optical unit, and said second light source, said second photodetector and said second light guide means are provided in a second optical unit.

43. An optical pickup for reproducing information from an optical disk recording medium, comprising:
   a first optical unit including a first light source for emitting light having a first wavelength, and a first photodetector for detecting light reflected from the optical disk;
   a second optical unit including a second light source for emitting light having a second wavelength, said first wavelength being shorter than said second wavelength, and a second photodetector for detecting light reflected from the optical disk;
   light splitting means for guiding the light having the first wavelength and the light having the second wavelength to generally a same optical axis; and an objective lens, wherein:

an optical path of said light having said first wavelength from said first light source to said objective lens is bent by said light splitting means, and the following relationship is established:

L1>L2 where L1 represents an optical distance from said first light source to said objective lens, and L2 represents an optical distance from said second light source to said objective lens.

44. An optical pickup for reproducing information from an optical disk recording medium, comprising:

a first optical unit including a first light source for emitting light having a first wavelength, and a first photodetector for detecting light reflected from the optical disk;

a second optical unit including a second light source for emitting light having a second wavelength, said first wavelength being shorter than said second wavelength, and a second photodetector for detecting light reflected from the optical disk;

light splitting means for guiding the light having the first wavelength and the light having the second wavelength to generally a same optical axis;

a collimator lens for converting the light having the first wavelength from divergent light beams into parallel light beams and for reducing an angle of divergence of the light having the second wavelength; and an objective lens, wherein:

said collimator lens is disposed between said light splitting means and said objective lens, an optical axis of said second light source is disposed on a line of extension of said same optical axis, said optical axis of said first light source intersects said same optical axis, said light splitting means is disposed at a position including a point of intersection of the optical axes of said first and second light sources, and the following relationship is established:

L1>L2 where L1 represents an optical distance from said first light source to said collimator lens, and L2 represents an optical distance from said second light source to said collimator lens.

* * * * *